US009252004B2

(12) United States Patent
Otsuka et al.

(10) Patent No.: US 9,252,004 B2
(45) Date of Patent: Feb. 2, 2016

(54) IONIZATION DEVICE, MASS SPECTROMETRY APPARATUS, MASS SPECTROMETRY METHOD, AND IMAGING SYSTEM

(71) Applicant: CANON KABUSHIKI KAISHA, Tokyo (JP)

(72) Inventors: Yoichi Otsuka, Kawaskai (JP); Masafumi Kyogaku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/446,771

(22) Filed: Jul. 30, 2014

(65) Prior Publication Data

US 2015/0034817 A1 Feb. 5, 2015
US 2015/0318157 A9 Nov. 5, 2015

(30) Foreign Application Priority Data

Aug. 2, 2013 (JP) ................................ 2013-161331
Sep. 5, 2013 (JP) ................................ 2013-183962

(51) Int. Cl.

| | |
|---|---|
| ***G01Q 30/00*** | (2010.01) |
| ***G01Q 30/02*** | (2010.01) |
| ***G01Q 30/12*** | (2010.01) |
| ***G01Q 30/14*** | (2010.01) |
| ***H01J 49/04*** | (2006.01) |
| ***H01J 49/24*** | (2006.01) |

(Continued)

(52) U.S. Cl.
CPC ............ *H01J 49/10* (2013.01); *H01J 49/0004* (2013.01); *H01J 49/0027* (2013.01); *H01J 49/0459* (2013.01); *H01J 49/24* (2013.01); *H01J 49/26* (2013.01)

(58) Field of Classification Search
USPC ............ 250/281, 282, 288, 423 R, 424, 425; 850/8, 14, 15, 21, 22, 38, 52, 56, 850/61–63
See application file for complete search history.

(56) References Cited

U.S. PATENT DOCUMENTS 7,528,368 B2 * 5/2009 Lenke ...................... C07K 1/24 250/288
8,957,370 B1 * 2/2015 Kyogaku ............ H01J 49/0459 250/288

(Continued)

OTHER PUBLICATIONS

Yoichi Otsuka et al., "Scanning probe electrospray ionization for ambient mass spectrometry" Rapid Communications in mass spectrometry, 26, 2725 (2012).

(Continued)

*Primary Examiner* — Bernard E Souw
(74) *Attorney, Agent, or Firm* — Canon USA, Inc. IP Division

(57) ABSTRACT

A mass spectrometry apparatus includes a holding table that holds a specimen to be ionized, a probe that identifies a portion of the specimen to be ionized, an ion extraction electrode that extracts ions obtained by ionizing the specimen, a liquid supplying unit that supplies liquid to between the specimen and the probe to form a liquid bridge between the specimen and the probe, a vibrating unit that vibrates one of the probe and the holding table, an electric field generating unit that generates an electric field between the probe and the ion extraction electrode, a mass spectrometry unit that mass analyzes ions extracted by the ion extraction electrode, and a synchronization unit configured to synchronize a time at which ions are generated from the portion with a time at which the mass spectrometry unit measures the ions.

20 Claims, 9 Drawing Sheets

(51) Int. Cl.
*H01J 49/26* (2006.01)
*H01J 49/10* (2006.01)
*H01J 49/00* (2006.01)

(56) References Cited

U.S. PATENT DOCUMENTS

2003/0193020 A1* 10/2003 Van Berkel .................. 250/288
2004/0232324 A1* 11/2004 Berkout et al. ............... 250/282
2007/0221861 A1* 9/2007 Lenke ...................... C07K 1/24 250/425
2010/0050737 A1* 3/2010 Wolters ........................ 73/23.22
2014/0353488 A1* 12/2014 Takats ................ G01N 30/7253 250/282
2015/0034821 A1* 2/2015 Kyogaku ............ H01J 49/0459 250/287
2015/0155148 A1* 6/2015 Kyogaku ............ H01J 49/0409 250/287

OTHER PUBLICATIONS

Hiraoka, "Fundamentals of Mass Spectrometry—Fundamentals of Electrospray-", J. Mass Spectrom. Soc. Jpn., vol. 58, 139-154, 2010 (including English abstract).

* cited by examiner

IONIZATION DEVICE, MASS SPECTROMETRY APPARATUS, MASS SPECTROMETRY METHOD, AND IMAGING SYSTEM

BACKGROUND

1. Field

The present invention relates to an ionization device and a mass spectrometry apparatus for ionizing a specimen and mass analyzing a specimen.

2. Description of the Related Art

For analysis of component in a surface of a solid specimen, a technology for ionizing a solid substance in an atmospheric pressure environment has been developed.

For example, such a technique is described in the following non-patent literature: Yoichi Otsuka et al., "Scanning probe electrospray ionization for ambient mass spectrometry" Rapid Communications in mass spectrometry, 26, 2725 (2012). In the technique, a small volume of the solvent is deposited onto a microregion of a surface of a solid specimen, and a component of the specimen is dissolved in the solvent. Thereafter, the component is ionized by electrospray ionization. Generated ions are introduced into a mass spectrometry apparatus, which measures the mass-to-charge ratio of the ion. Thus, the component can be analyzed. To deposit the solvent onto the microregion of the surface of the solid specimen, a probe formed from a needle-like capillary is used. The solvent is continuously fed to the probe. A liquid bridge is formed between the probe and the surface of the solid specimen that is located in close proximity to the probe. The component contained in the surface of the solid specimen is dissolved into the liquid bridge. The solvent having the component dissolved therein is ionized by applying a voltage to the solvent. The probe is vibrated and, thus, the solvent that is continuously supplied to the surface of the solid specimen is ionized. Such a technique is referred to as Tapping-mode Scanning Probe Electrospray Ionization (Tapping-mode SPESI). In contrast, a technique for ionizing the solvent with the probe remaining in close proximity to the surface of the solid specimen is referred to as Contact-mode Scanning Probe Electrospray Ionization (Contact-mode SPESI).

In the Tapping-mode SPESI described in non-patent literature above, a liquid bridge is alternately formed and disrupted. In the technique, dissolution of a component into the liquid bridge and ionization of the component are alternately and continuously performed. The frequency of the formation of the liquid bridge and the ionization is determined by the frequency of vibration of the probe. In addition, the mass spectrometry apparatus is electrically separated from an ionization device. The mass spectrometry apparatus and the ionization device are independently driven. The ions introduced into the mass spectrometry apparatus are measured within a predetermined measurement period of time.

In the technique, measurement using mass spectrometry is performed even during a period of time during which ionization is not performed, that is, during a period of time during which a liquid bridge is being formed and during a period of time during which ions are being generated after the liquid bridge is formed.

As a result, a noise signal generated when ionization is not performed is mixed with measurement data, which makes mass spectral analysis of the data difficult.

In addition, it is difficult to finely control the number of ionization processes performed within the measurement time of ionization, the quantitative capability of measurement is low and, thus, the quantitative capability when the measurement values each measured in one measurement process are compared with one another is low.

In contrast, in terms of Contact-mode SPESI, a technique for steadily vibrating a substrate having a solid specimen placed thereon is proposed. In such a technique, vibration of the substrate makes ionization stable. However, measurement of ions is performed during an entire period of vibration time of the substrate, a noise signal generated during a period of time during which ionization is not actually performed is mixed in measurement data. In addition, when the substrate is steadily vibrated for a long time, a device for generating the vibration is heated. The heat may cause the amplitude and the frequency of the vibration to fluctuate.

SUMMARY

The present disclosure provides an ionization device and the mass spectrometry apparatus capable of measuring the component distribution in a microregion of a surface of a specimen in an atmospheric pressure environment with a high sensitivity.

According to an aspect of the present disclosure, an ionization device includes a holding table configured to hold a specimen to be ionized, a probe configured to identify a portion of the specimen to be ionized, an ion extraction electrode configured to extract ions obtained by ionizing the specimen, a liquid supplying unit configured to supply liquid to between the specimen and the probe to form a liquid bridge between the specimen and the probe, a vibrating unit configured to vibrate one of the probe and the holding table, an electric field generating unit configured to generate an electric field between the probe and the ion extraction electrode, and a synchronization unit configured to performing at least one of the following two synchronization processes on the basis of vibration of the probe or the holding table:

(i) synchronizing a time at which ions are generated from the portion with a time at which a mass spectrometry unit for mass analyzing the ions extracted by the ion extraction electrode measures the ions, and (ii) synchronizing vibration of the probe with vibration of the holding table.

According to another aspect disclosed herein, a mass spectrometry apparatus includes a holding table configured to hold a specimen to be ionized, a probe configured to identify a portion of the specimen to be ionized, an ion extraction electrode configured to extract ions obtained by ionizing the specimen, a liquid supplying unit configured to supply liquid to between the specimen and the probe to form a liquid bridge between the specimen and the probe, a vibrating unit configured to vibrate one of the probe and the holding table, an electric field generating unit configured to generate an electric field between the probe and the ion extraction electrode, a mass spectrometry unit configured to mass analyze ions extracted by the ion extraction electrode, and a synchronization unit configured to synchronize a time at which ions are generated from the portion with a time at which the mass spectrometry unit measures the ions.

According to the present disclosure, an ionization device capable of measuring the component distribution of a microregion of a surface of a specimen in an atmospheric pressure environment with a high sensitivity and a mass spectrometry apparatus or an imaging system including the ionization device are provided.

Further features of the present invention will become apparent from the following description of exemplary embodiments with reference to the attached drawings.

DESCRIPTION OF THE EMBODIMENTS

First Exemplary Embodiment

Figure 1:
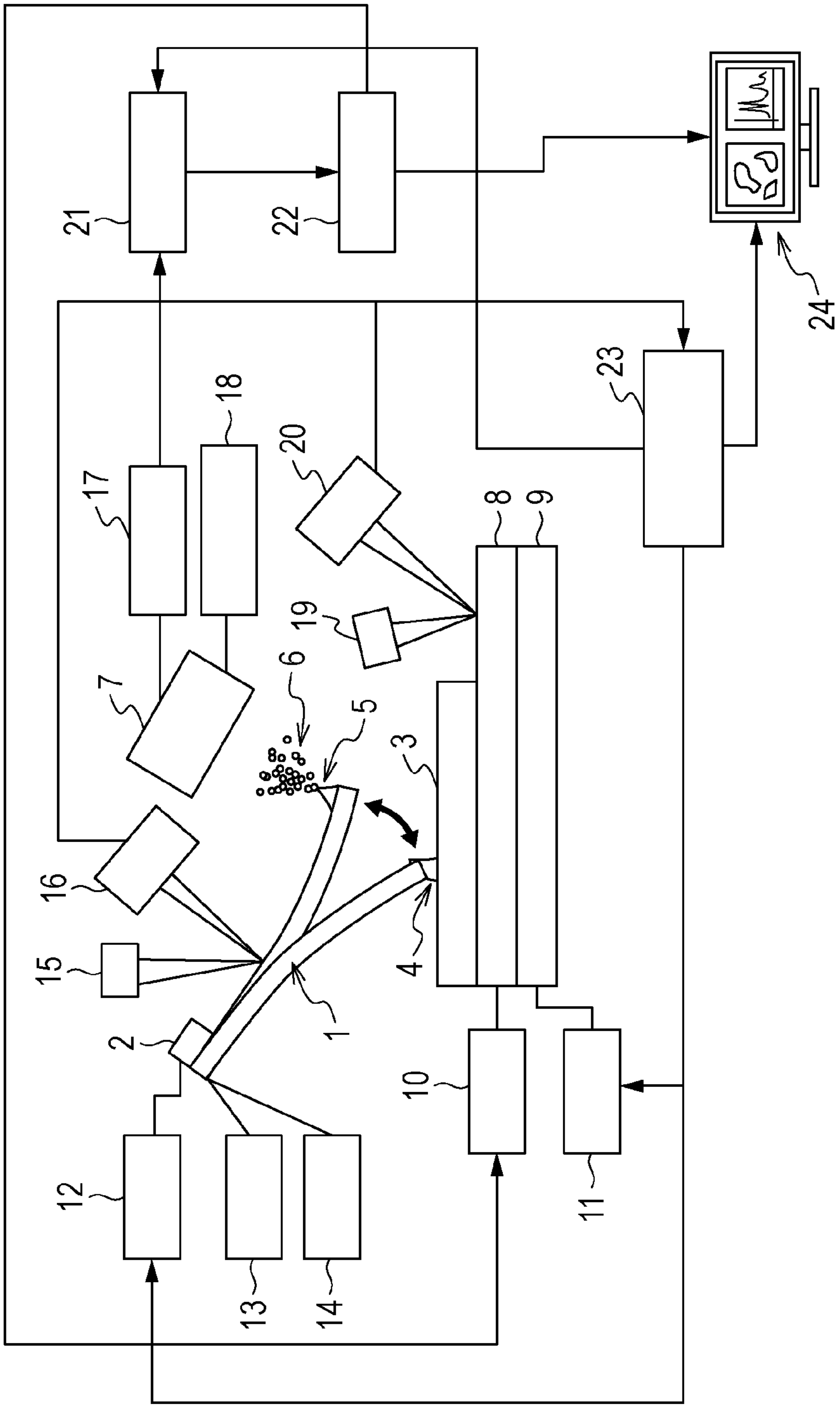
FIG. 1 is a schematic illustration of an imaging system including an ionization device according to a first exemplary embodiment

FIG. 1 is a schematic illustration of an imaging system including an ionization device according to the first exemplary embodiment of the present invention. The imaging system includes a probe 1 having a flow passage therein, where the flow passage allows liquid to flow through, a vibration providing unit 2 that vibrates the probe 1, a solid specimen 3, a liquid bridge 4 formed between the probe 1 and the solid specimen 3, a Taylor cone 5, charged fine liquid droplets 6, an ion entrapment unit 7 including an ion extraction electrode for entrapping ions into a mass spectrometry apparatus, an XY stage 8 serving as a holding table that holds the solid specimen 3, a Z stage 9 for moving the solid specimen 3 in a Z direction (the vertical direction in FIG. 1), specimen stage control devices 10 and 11, a voltage applying apparatus 12, a liquid supply unit 13 that supplies liquid to the probe 1, a voltage applying apparatus 14, light sources 15 and 19, displacement sensors 16 and 20 serving as measurement units that measure displacement, a mass spectrometry unit 17, a voltage applying apparatus 18, an ion counter 21, an image forming unit 22, a displacement calculation device 23, and a display unit 24.

The ion counter 21 is incorporated into the mass spectrometry unit 17 and be used. Alternatively, instead of being incorporated into the mass spectrometry unit 17, the ion counter 21 may be externally connected to the mass spectrometry unit 17 and be used. In either case, the number of ions entrapped in the mass spectrometry unit 17 can be measured. In addition, the ion counter 21 includes an input terminal of a gate signal. By inputting an appropriate signal to the input terminal of a gate signal, driving of the ion counter 21 can be controlled.

An ion detector (e.g., a microchannel plate detector) and an electric signal measuring device (e.g., an analog-to-digital converter (ADC) or a time-to-digital converter (TDC)) can be used as the ion counter 21. In addition, a device for adjusting the waveform of the electric signal (e.g., a discriminator or an amplifier circuit) may be provided between the ion detector and a measuring instrument of the electric signal. The input terminal of a gate signal is incorporated into the measuring instrument of the electric signal.

The liquid supply unit 13 supplies the solvent for dissolving a component to be analyzed contained in the solid specimen 3 or mixed solution of a component to be analyzed and the solvent (hereinafter, the solvent and the mixed solution are collectively and simply referred to as "liquid"). The liquid supplied from the liquid supply unit 13 is led to the flow passage in the probe 1. At that time, a voltage is applied to the liquid by the voltage applying apparatus 14. The voltage applied to the liquid is one of a DC voltage, an AC voltage, a pulse voltage, and a zero volt.

According to the present exemplary embodiment, the liquid supplied from the liquid supply unit 13 forms the liquid bridge 4 between the solid specimen 3 and the probe 1. At that time, the solid specimen 3 is an object formed from an object to be measured that is placed on one of a metal substrate, an electrically insulating material substrate, and a semiconductor substrate, and the object to be measured requires that the component distribution in the microregion of the object is measured. Examples of the object include a biological tissue and bodily fluid. However, the object may be an object other than a biological tissue and bodily fluid.

In addition, the liquid that forms the liquid bridge 4 is turned into the fine liquid droplets 6 by the vibration of the probe 1, and the fine liquid droplets 6 are charged by the electric field generated by the voltage applying apparatus 14 and the voltage applying apparatus 18. Thus, the component of the object to be measured can be entrapped in the ion entrapment unit 7 in the form of ions. That is, according to the present exemplary embodiment, the probe 1 functions as a supply unit for supplying the liquid onto the substrate, a substance acquiring unit, a transport unit for transporting the liquid to a position that is suitable for ionization, and a forming unit for forming a Taylor cone for ionization.

Note that according to the present exemplary embodiment, an electrically conductive probe has such a configuration that provides electrical conductivity to the flow passage and a connection pipe in the probe 1 and that allows a voltage to be applied to the liquid contained in the probe 1. To achieve such a structure, it is desirable that an electrically conductive member be disposed in the entire or part of the flow passage that is in contact with the liquid.

However, the electrically conductive member is not necessarily disposed in the flow passage and the connection pipe inside the probe 1. It is only required that the structure allows the liquid contained in the top end portion of the probe 1 to be charged before the liquid reaches the top end of the probe, that is, the electrically conductive member can be located in a mid-top end portion.

To achieve the suitable configuration of the probe 1, at least part of the material of the probe 1 has electrical conductivity. Examples of such a material include a metal and a semiconductor. However, any material that has a property generating a reproducible constant voltage can be used. That is, according to the present exemplary embodiment, a voltage is applied to the liquid by applying a voltage to a conductive portion of the probe 1.

As used herein, the term "application of voltage to a probe" is used to denote a process to apply an electric potential that differs from the electric potential of an ion extraction electrode (described in more detail below) to a conductive portion that constitutes at least part of the probe and generate an electric field between the conductive portion and the ion extraction electrode. As long as the electric field is generated, the applied voltage may be zero volt. The material of at least part of the probe 1 should be electrically conductive. For example, a stainless steel, gold, or platinum can be used as the material.

For example, a tubule, such as a silica capillary or a metal capillary, capable of supplying a small volume of liquid can be used as each of the probe 1 and the connection pipe that connects the probe 1 to the liquid supply unit 13. The tubule may have the same electric conductivity as any one of an insulating material, a conductor, and a semiconductor. Note that the electrically conductive flow passage should be at least part of the flow passage that allows the liquid supplied from the liquid supply unit 13 to pass through inside of the probe 1 and reach the top end of the probe 1 on the opposite side of the liquid supply unit 13. The position of the electrically conductive flow passage is not limited to any particular position of the probe 1. For example, the entire or part of the electrically conductive flow passage may be included in the flow passage or the connection pipe inside the probe 1.

If the probe 1 itself is electrically conductive, the voltage applied by the voltage applying apparatus 14 propagates through the probe 1 and is applied to the liquid in the flow passage inside the probe 1. In contrast, if the probe 1 is made of an electrically insulating material, the voltage applied to the electrically conductive flow passage does not propagate to the probe 1. At that time, the voltage is applied to the liquid flowing in the electrically conductive flow passage, and the liquid enters the probe 1. Accordingly, even when the voltage is not propagated to the probe 1, the voltage can be applied to the liquid. Thus, the liquid is charged.

The liquid supplied from the liquid supply unit 13 is provided from the top end of the probe 1 onto the solid specimen 3. In this manner, a minutely small amount of the substance contained in the solid specimen 3 can be dissolved into the liquid and be ionized in an atmospheric pressure environment.

In the above-described configuration according to the present exemplary embodiment, the probe 1 can be vibrated. According to the present exemplary embodiment, the vibration of the probe 1 is the periodic motion of the probe 1 such that the position of the top end of the probe 1 adjacent to the solid specimen 3 is spatially displaced. In particular, it is desirable that the probe 1 be bending-vibrated in a direction crossing the axis direction of the probe 1. To vibrate the probe 1, mechanical vibration is provided from the vibration providing unit 2 to the probe 1. In addition, by stopping supply of vibration from the vibration providing unit 2, the vibration of the probe 1 can be stopped.

In general, the natural resonance frequency in a primary mode of a cantilevered object can be expressed by using the length, the density, the cross sectional area, the Young's modulus, and the second moment of area of the cantilever. Since the needle-like probe 1 according to the present exemplary embodiment is similar to a cantilevered probe, the natural resonance frequency of the probe 1 can be controlled by controlling the material and the size of the probe 1, the type and volume of the liquid supplied to the probe 1, and the magnitude of the electric field generated between the probe 1 and the ion entrapment unit 7. Examples of the material of the probe 1 include, but not limited to, silica, silicon, a polymer material, and a metal material. Alternatively, a probe formed by joining two or more materials having different densities and Young's moduli may be used. In addition, any device that generates vibration can be used as the vibration providing unit 2. For example, a piezoelectric device or a vibration motor may be used as the vibration providing unit 2. Vibration of the probe 1 may be either continuous vibration or intermittent vibration. The timing at which the voltage is applied to the liquid and the timing at which vibration is provided to the probe 1 may be determined as needed.

In addition, the solvent may be supplied from the liquid supply unit 13 through a flow passage formed in the surface of the probe 1. For example, a minutely small groove may be formed in the surface of the probe 1. By using capillarity, the solvent introduced from the liquid supply unit 13 may flow in the surface of the probe 1 and reach the top end portion of the probe 1.

Although the configuration in which the liquid supply unit 13 is physically connected to the probe 1 is illustrated in FIG. 1, the liquid supply unit 13 may be spatially separated from the probe 1. For example, by using an inkjet technique, the solvent may be ejected from the liquid supply unit 13 spatially separated from the probe 1 to the probe 1 and be deposited onto the probe 1.

The frequency and amplitude of the vibration of the probe 1 may be set to desired values. The values may be constant values or modulated values. For example, by varying a voltage value or a frequency value output from the voltage applying apparatus 12 that is electrically connected to the vibration providing unit 2, the amplitude and frequency of the vibration of the probe 1 can be adjusted to the desired values.

The Z stage 9 is physically connected to the XY stage 8 and the solid specimen 3. The Z stage 9 is used to vibrate the solid specimen 3 in the vertical direction. The Z stage 9 can vibrate a specimen on the basis of a control signal output from the specimen stage control devices 11 connected to the Z stage 9. The frequency and amplitude of the vibration may be set to desired values. The values may be constant values or modulated values. In such a case, by varying the voltage value or the frequency value output from the specimen stage control devices 11, the frequency and amplitude of the vibration can be adjusted to the desired values.

At that time, the XY stage 8 may be fixed onto the Z stage 9. Alternatively, the Z stage 9 may be fixed onto the XY stage 8.

The light source 15 and the displacement sensor 16 are used to measure the vibration of the probe 1. The light source 15 and the displacement sensor 16 are disposed so that a spot light ray formed by collecting the light emitted from the light source 15 is reflected by the probe 1 and is led to the displacement sensor 16. By detecting the position of the reflected spot light ray using the displacement sensor 16, the frequency and amplitude of the vibration of the probe 1 can be measured. Examples of the light source 15 include a laser light source, a halogen light source, and a light emitting diode (LED) light source. In addition, one of a lens and a pinhole that collects light or one of a cylindrical lens and a slit that collect light into a line shape may be disposed in front of the light source 15. Like the light source 15 and the displacement sensor 16, the light source 19 and the displacement sensor 20 are used to measure the vibration of the XY stage 8 and the vibration of the Z stage 9.

In this example, a light source and a displacement sensor are used to measure the vibration of the probe 1, the XY stage 8, and the Z stage 9. However, instead of the light source and the displacement sensor, another type of displacement sensor may be used. Examples of another type of displacement sensor include an electrostatic capacitance displacement sensor, an eddy current displacement sensor, a laser Doppler displacement sensor, and a piezoelectric displacement sensor. In the case of an electrostatic capacitance displacement sensor, a portion having electric conductivity can be formed in each of the probe 1, the XY stage 8, and the Z stage 9. The vibration can be measured by detecting the variation of the electrostatic capacitance between the portion and the sensor. In the case of an eddy current displacement sensor, an eddy current generated in a metal which is part of each of the probe 1, the XY stage 8, and the Z stage 9 is measured from a variation of the inductance of a coil of the sensor that generates an alternating-current magnetic field. Since the variation of the inductance depends on the distance between the sensor and the metal, the vibration can be measured. In the case of a laser Doppler displacement sensor, the vibration can be measured by detecting the frequency of reflected light when a laser beam is emitted to the probe 1, the XY stage 8, and the Z stage 9. In the case of a piezoelectric displacement sensor, the vibration can be measured by detecting the pressure applied to a piezoelectric device in contact with each of the probe 1, the XY stage 8, and the Z stage 9 in the form of a voltage signal.

The electric signals output from the displacement sensor 16 and the displacement sensor 20 are input to the displacement calculation device 23. The frequency, amplitude, and phase of the vibration of the probe and the stage can be measured using the electric signals.

According to the present exemplary embodiment, a vibration unit that vibrates the probe is independent from a vibration unit that vibrates the specimen. Accordingly, the following three vibratory modes can be provided as a drive mode. That is, the three vibratory modes are (A) a mode for vibrating the probe, (B) a mode for vibrating the solid specimen, and (C) a mode for independently vibrating the probe and the solid specimen at the same time.

FIG. 1 is a schematic illustration when the drive mode (A) or (C) is selected. In the drive mode (B), provision of a signal from the voltage applying apparatus 12 to the vibration providing unit 2 is stopped, and the probe 1 is located in close proximity to a solid specimen or is in contact with the solid specimen.

In the drive mode (A) in which the probe 1 is vibrated, a signal is input to the vibration providing unit 2, and provision of a signal to the specimen stage control device 11 is stopped. As a result, the probe 1 vibrates, and the vibration of the Z stage 9 is stopped.

In the drive mode (B) in which the solid specimen is vibrated, provision of a signal to the vibration providing unit 2 is stopped, and a signal is input to the specimen stage control device 11. As a result, the probe 1 is stopped, and the Z stage 9 vibrates. If the probe 1 is in contact with a surface of the solid specimen 3, vibration of the Z stage 9 propagates to the probe 1. Accordingly, the probe 1 can be vibrated. Even in such a case, the drive mode (B) is applied.

In the drive mode (C) in which the probe 1 and the solid specimen 3 are independently vibrated, a signal is input to the vibration providing unit 2. At the same time, a signal is input to the specimen stage control device 11. As a result, the probe 1 and the Z stage 9 independently vibrate.

Figure 2:
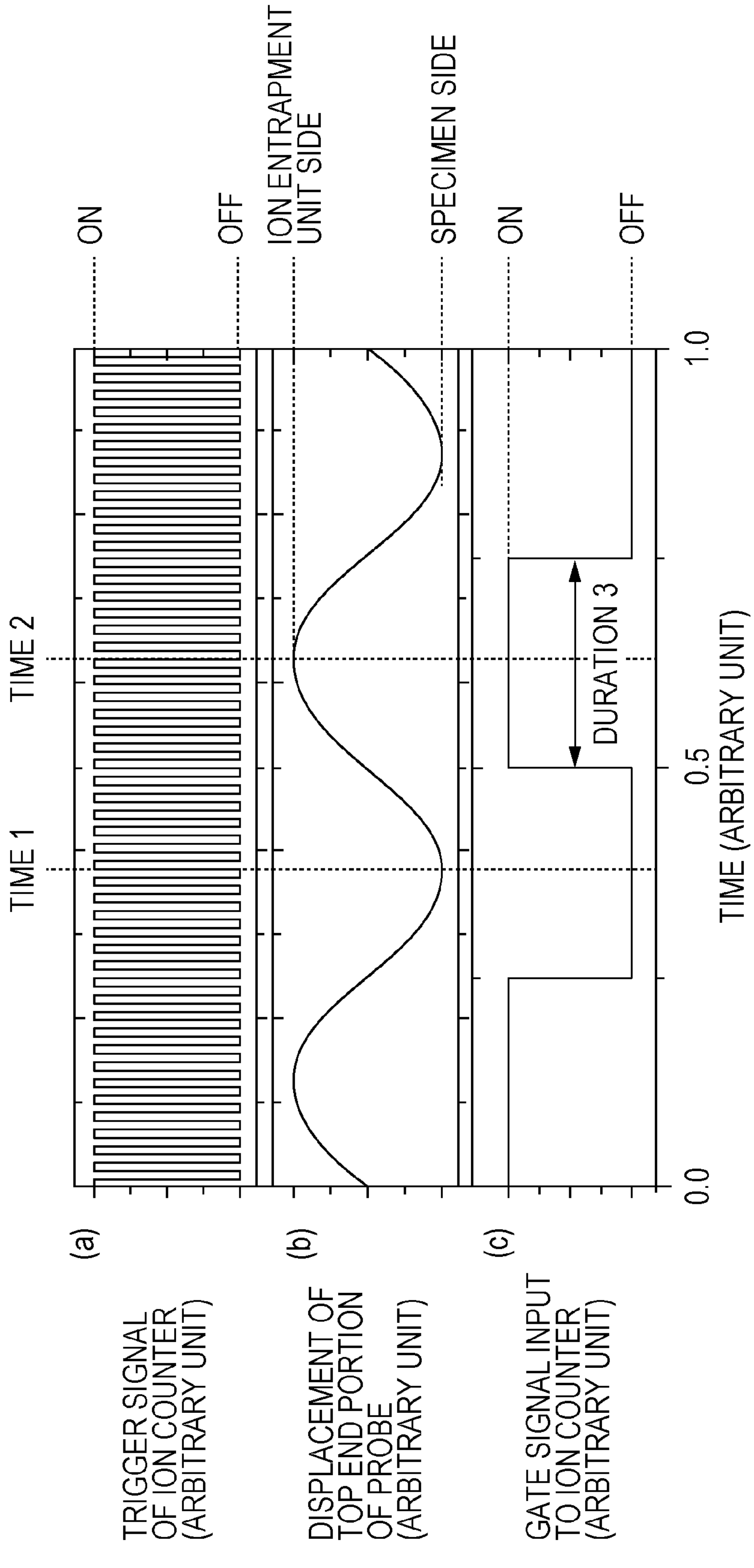
FIG. 2 is a timing diagram illustrating the operation timing of each of apparatuses in a first drive mode of the ionization device according to the first exemplary embodiment.

FIG. 2 is a timing diagram illustrating the operation timing of each of the apparatuses in the drive mode (A) of the ionization device according to the first exemplary embodiment. In the timing diagram, a waveform chart (a) illustrates the voltage value of a trigger signal for measurement performed by the ion counter 21, a waveform chart (b) illustrates the voltage value of a vibration signal for the probe 1, and a waveform chart (c) illustrates the gate voltage value input to the ion counter 21. In general, the ion counter 21 operates so as to intermittently receive the trigger signal for the mass spectrometry unit 17 and, after receiving the trigger signal, count the number of ions. The type of trigger signal differs in accordance with the configuration of an ion separation unit of the mass spectrometry unit 17. According to the present exemplary embodiment, for example, a quadrupole mass spectrometer, a time-of-flight mass spectrometer, a magnetic sector mass spectrometer, or an ion-trap mass spectrometer can be used as the mass spectrometry unit 17. In addition, the trigger signal may be generated at a particular timing for each of the types of mass spectrometer.

For example, in quadrupole mass spectrometers, a signal indicating a point in time at which application of a high-frequency voltage to the quadrupole is started may be used as the trigger signal. In time-of-flight mass spectrometers, a signal indicating a point in time at which a pulse voltage for accelerating the speed of ions in a device for measuring the flight time of the ions is applied may be used as the trigger signal. In magnetic sector mass spectrometers, a signal indicating a point in time at which application of a magnetic field to a sector electrode is started may be used as the trigger signal. In ion-trap mass spectrometers, a signal indicating a point in time at which ions are entrapped in an ion trap may be used as the trigger signal. In general, the frequency of the pulse voltage of a time-of-flight mass spectrometer is in the range of several KHz to several tens of kHz. In addition, the frequency of ion entrapment performed by an ion-trap mass spectrometer is in the range of several tens Hz to several kHz. That is, in general, the frequencies are higher than the frequency of vibration of a probe.

The probe 1 vibrates, and formation of a liquid bridge and ionization are alternately performed. The frequency of vibration of the probe 1 is in the range of hundred Hz to tens of KHz. In FIG. 2, the frequency of the trigger signal of the mass spectrometry unit 17 is 20 times the frequency of vibration of the probe 1. At a time 1, the probe 1 is located so as to be in close proximity to or in contact with the solid specimen 3 and, thus, a liquid bridge is formed between the probe 1 and the surface of the solid specimen 3. In addition, at a time 2, the probe 1 is moved away from the solid specimen 3 and comes close to the ion entrapment unit 7, where ionization is performed. A gate voltage value (c) input to the ion counter 21 is synchronized with the voltage value (b) of the signal for vibrating the probe 1. The output gate voltage value (c) is set so as to be turned ON in a given time window around the time 2 of the voltage value (b) of the signal for vibrating the probe 1. At that time, a duration 3 is defined as a period of time during which ions are generated. The duration 3 can be set to a desired value. The gate voltage value (c) that is output is input to the input terminal of a gate signal of the ion counter 21. The ion counter 21 is operated only when the gate voltage value (c) is being output. As a result, only for the period of time indicated by the "duration 3", during which ions are generated by the probe 1, the ion counter 21 can be operated. Accordingly, during a period of time during which the liquid bridge is formed and during a period of time from the time the liquid bridge is formed to the time ions are generated, a noise signal is not measured. In this manner, a noise signal included in a measurement data signal can be reduced.

In the above-described example, when the duration 3 is set, the voltage value (b) of a vibration signal for the probe 1 is defined as a reference signal for regulating a period of time during which electrospray ionization is performed, and the gate voltage value (c) that is synchronized with the reference signal is used. Note that if a signal indicating the displacement of the top end portion of the probe 1 is synchronized with the probe vibration signal, the signal output from the displacement sensor 16 may be used as the reference signal instead of the voltage value (b) of the signal for vibrating the probe 1. Alternatively, if a phase difference exists between the signal for vibrating the probe 1 and the signal indicating the displacement of the top end portion of the probe 1, either the probe vibration signal or the displacement signal may be selected as the reference signal. Thereafter, by adjusting the rise time and the fall time of the gate voltage value (c) that is synchronized with the reference signal, the phase difference may be compensated for.

Figure 3:
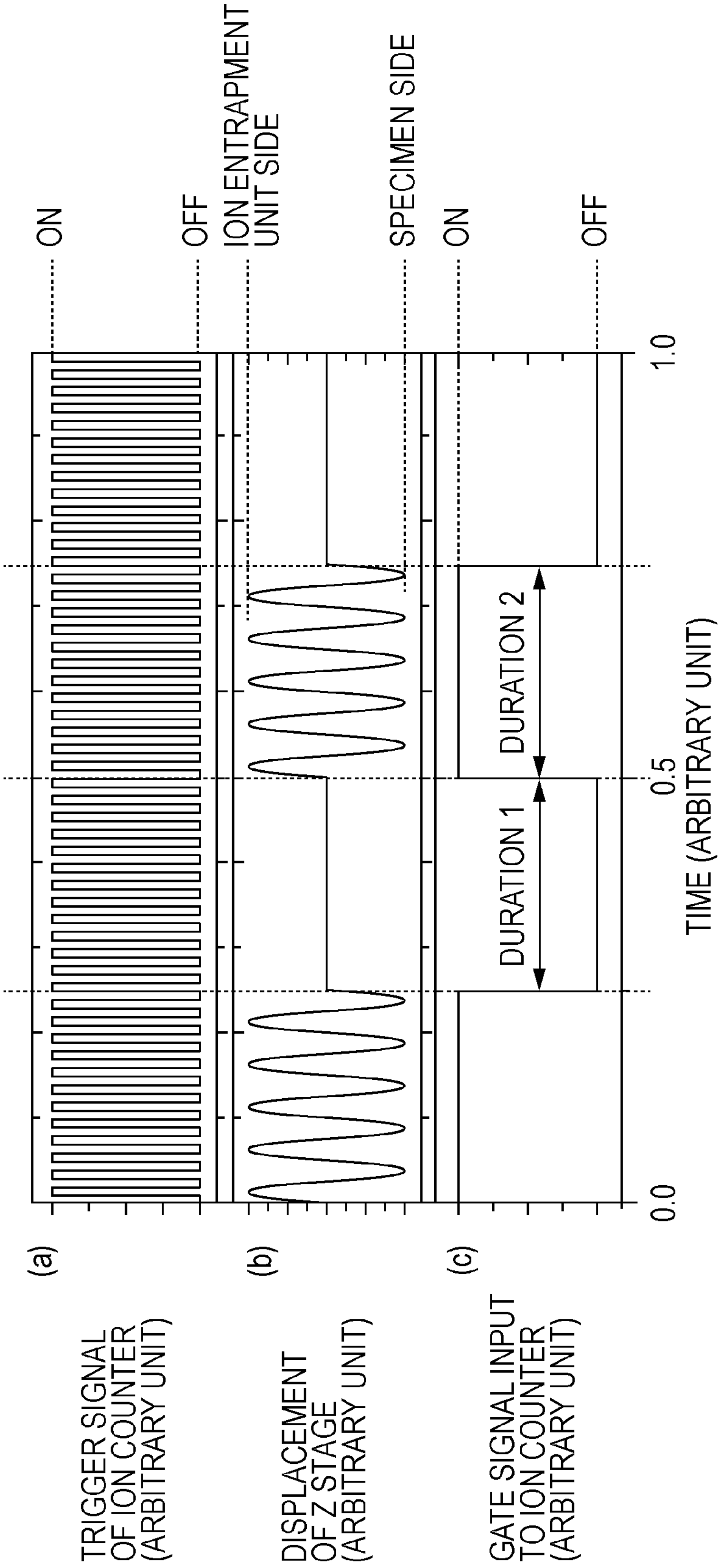
FIG. 3 is a timing diagram illustrating the operation timing of each of apparatuses in a second drive mode of the ionization device according to the first exemplary embodiment.

FIG. 3 is a timing diagram illustrating the operation timing of each of the apparatuses in the drive mode (B) of the ionization device according to the first exemplary embodiment. In the timing diagram, a trigger signal (a) for measurement performed by the ion counter 21 connected to the mass spectrometry unit 17, a vibration signal (b) for the Z stage 9, and the gate voltage signal (c) input to the ion counter 21 are illustrated. The vibration signal input to the Z stage 9 is modulated so as to be alternately turned ON and OFF for a predetermined period of time. Ions are more stably generated in a duration 2 than in a duration 1 for which the Z stage 9 is not vibrated. By modulating the vibration of the Z stage 9 in this manner, heat generated when the Z stage 9 is vibrated at high speed (at 1 KHz or higher) can be advantageously reduced. If the Z stage 9 is continuously vibrated, the Z stage 9 is overheated and, thus, the amplitude of the vibration may be decreased or malfunction of the Z stage 9 may occur. Accordingly, it is desirable that a modulating operation be performed to reduce the vibration time. In this manner, a cooling time period of the Z stage 9 can be provided. If the Z stage 9 is continuously vibrated, it is desirable that an additional cooling mechanism of the Z stage 9 be provided. Note that if a signal that is not modulated is used, setting should be performed so that the duration 1 is not present and the duration 3 in which ions are stably generated is considered as a duration in which ions are generated.

The gate voltage signal (c) is set so as to be output in synchronization with the duration 2 in which the vibration signal (b) for the Z stage 9 is generated. The gate voltage signal (c) is input to the input terminal of a gate signal of the ion counter 21. As a result, only for the period of time for which ions are stably generated by the probe 1, the ion counter 21 can be operated. Accordingly, a noise signal generated during a period of time until ionization is performed is not measured. In this manner, a noise signal included in a measurement data signal can be reduced.

In FIG. 3, a single pulse having a duration 2 is illustrated. However, the gate signal may be modulated in synchronization with the vibration signal (b). That is, pulse signals each having a duration that is less than the duration 2 and synchronizing with the positive or negative peak of the vibration signal (b) may be used.

In addition, when the duration 2 is set, the voltage value of the vibration signal (b) for vibrating the Z stage 9 is defined as the reference signal for determining the period of time during which electrospray ionization is performed, and the gate voltage signal (c) that is synchronized with the reference signal is used. However, the signal output from the displacement sensor 20 may be used as the reference signal instead of the voltage value of the vibration signal (b).

Figure 4:
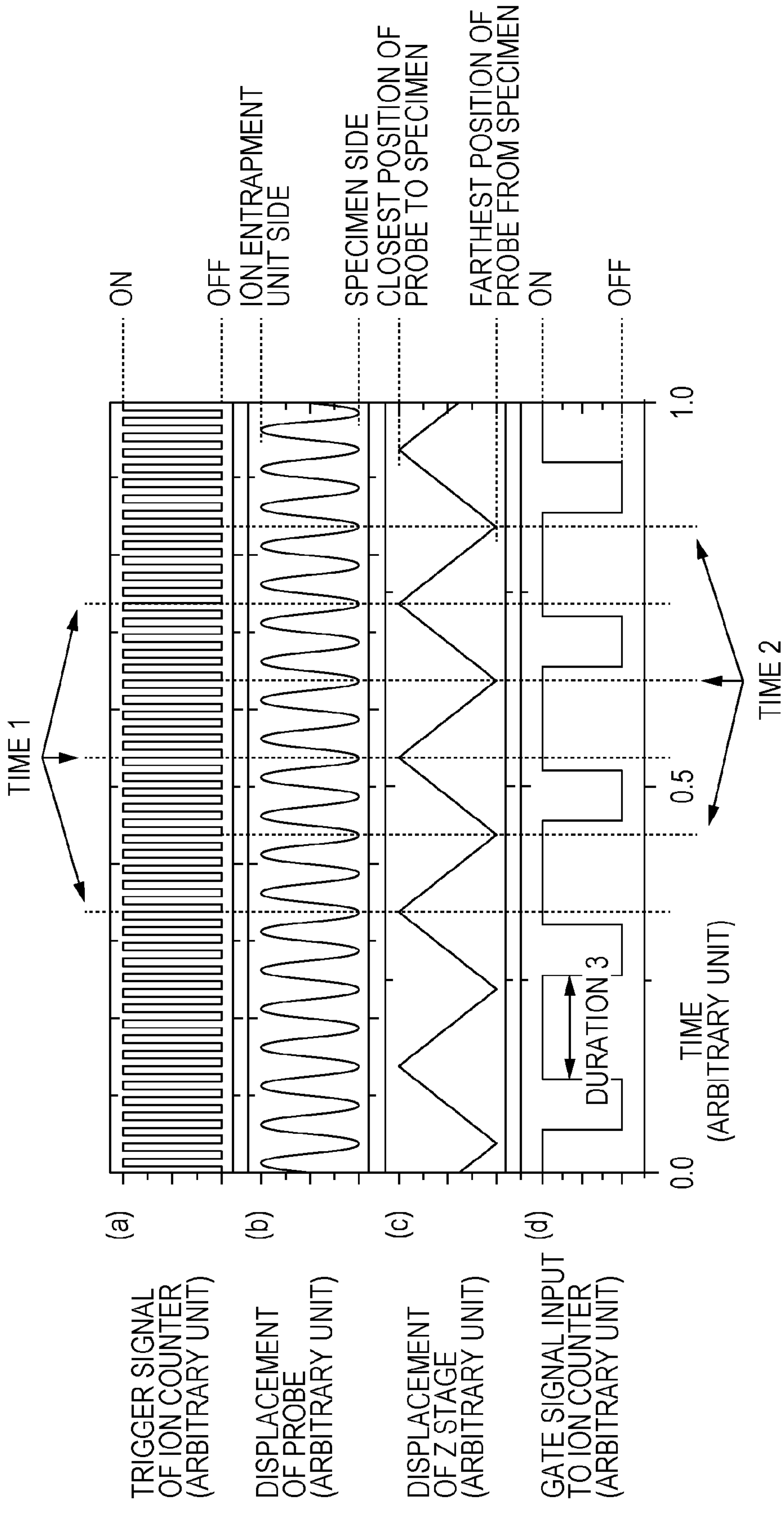
FIG. 4 is a timing diagram illustrating the operation timing of each of apparatuses in a third drive mode of the ionization device according to the first exemplary embodiment.

FIG. 4 is a timing diagram illustrating the operation timing of each of the apparatuses in the drive mode (C) of the ionization device according to the first exemplary embodiment. In the timing diagram, a trigger signal (a) for measurement performed by the ion counter 21 connected to the mass spectrometry unit 17, a vibration signal (b) for the probe 1, a vibration signal (c) for the Z stage 9, and a gate signal “d” input to the ion counter 21 are illustrated. The frequency of vibration of the Z stage 9 is set so as to be one fifth of the frequency of vibration of the probe 1. As described above, it is desirable that one of the two frequencies of vibration be an integer multiple of the other frequency and, in addition, the phase difference between the vibrations be 0 or 180 degrees. At the time 1, the probe 1 is in close proximity to or in contact with the solid specimen 3, and a liquid bridge is formed between the probe 1 and a surface of the solid specimen 3. At the time 2, the probe 1 is located so as to be the farthest from the solid specimen 3. After the liquid bridge is formed at the time 1 and before the next liquid bridge is formed, ionization is performed. The gate signal (d) is synchronized with the vibration signal (b) or the vibration signal (c). The gate signal (d) is set so as to be turned ON within a predetermined period of time immediately before the time 1. The duration 3 for which the gate signal (d) is ON is defined as a time period during which ions are generated. The duration 3 can be set to any value. As a result, the ion counter 21 is operated only when ions are stably generated from the probe 1. Thus, a noise signal generated during a period of time during which a desired component is not ionized is not measured. In this manner, a noise signal included in a measurement data signal can be reduced.

According to the present exemplary embodiment, in addition to advantages that are the same as in the above-described drive modes (A) and (B), an advantage that the absolute value of the distance between the probe 1 and the Z stage 9 is increased due to vibrations of both the probe 1 and Z stage 9 can be provided. Note that when the irregularity of the surface profile of the solid specimen 3 is significant and, thus, the vibration amplitude of the probe 1 needs to be increased so that formation of the liquid bridge and ionization are stably performed, it is desirable that the present exemplary embodiment be applied. While the present exemplary embodiment has been described with reference to the control signals of the specimen stage control device 11 and the voltage applying apparatus 12 being a triangle wave, a sine wave, or a square wave, the waveform is not limited thereto. For example, the waveform may be a sawtooth waveform or a waveform obtained by combining a triangle wave, a sine wave, a square wave, and a sawtooth wave illustrated in FIG. 2.

According to the present exemplary embodiment, when the duration 3 is set, the voltage value (b) of a vibration signal for the probe 1 is defined as a reference signal for regulating a period of time during which electrospray ionization is performed, and the gate voltage value (c) that is synchronized with the reference signal is used. However, instead of the voltage value (b) of the vibration signal, the signal output from the displacement sensor 16 or the displacement sensor 20 may be used as the reference signal.

In each of the drive modes (A), (B), and (C), the vibration state is measured by using the displacement calculation device 23. Thereafter, control signals are output from the displacement calculation device 23 to the specimen stage control device 11 and the voltage applying apparatus 12 so that a desired vibration state is obtained. The vibration state corresponds to an ion generation period for which electrospray ionization is performed and a non-ion generation period. Accordingly, the displacement calculation device 23 can be used to measure a period of time during which ions are generated through electrospray ionization.

For example, a period of time for which each of the voltages of the AC signals output from the displacement sensor 16 and the displacement sensor 20 is higher than a threshold voltage is measured as a period of time for which ionization is well performed. The measurement can be performed by measuring the signals output from the sensors using an oscilloscope or a circuit for generating a vibration control signal of a probe and a circuit for generating a vibration control signal of a solid specimen. Note that such circuits are included in a gate signal generation circuit (described in more detail below).

The threshold voltage can be set to any value. The threshold voltage is set to detect a period of time for which the probe 1 is located in close proximity to the ion entrapment unit 7 or a period of time for which the XY stage 8 and the Z stage 9 are vibrating. A voltage pulse is output from a waveform generator or the gate signal generation circuit (described in more detail below) in synchronization with a period of time for which ionization is well performed. The voltage pulse is input to the input terminal of a gate signal of the ion counter 21.

If a feedback circuit is provided in the displacement calculation device 23, the displacement calculation device 23 can automatically maintain stable vibration. When the probe 1 scans the solid specimen 3, a slight variation of the frequency or the amplitude may occur. At that time, by measuring a shift of a signal output from each of the displacement sensor 16 and the displacement sensor 20 from a reference signal that can be set in the displacement calculation device 23, generating a signal that corrects the shift, and outputting the signal to the specimen stage control device 11 and the voltage applying apparatus 12, stable scan can be performed. Note that the reference signal is a signal having a desired waveform used to determine the frequency and the amplitude of vibration of each of the probe 1 and the Z stage 9.

In addition, a slight timing shift may occur between the vibration of the probe 1 and the vibration of the Z stage 9 due to, for example, electrical wiring between the components and the electric capacitances of the components illustrated in FIG. 1. In such a case, by providing a delay circuit that controls the timing in the displacement calculation device 23, the timing shift between the vibration of the probe 1 and a control signal and the timing shift between the vibration of the Z stage 9 and a control signal can be compensated for.

According to the present exemplary embodiment, by selecting one of the drive modes (A), (B), and (C), the following processes are alternately performed: (i) a process to supply liquid from a probe onto a solid specimen and form a liquid bridge between the probe and the solid specimen, and (ii) a process to generate an electric field for generating ions between the conductive portion of the probe in contact with the liquid and an ion extraction electrode. That is, by changing the position of one end of the probe that vibrates, the position of the probe can be set to the position optimum for performing each of the processes (i) and (ii).

By intermittently or continuously providing the liquid from the probe 1, the liquid bridge 4 is formed. When the liquid bridge 4 is formed, the probe 1 may or may not be in contact with the solid specimen 3. If the probe 1 is in contact with the solid specimen 3, the liquid bridge 4 can be formed more reliably. The liquid bridge 4 is formed from liquid that bridges between 1 and the solid specimen 3. The liquid bridge 4 is formed by using, for example, the surface tension. A substance contained in the solid specimen 3 is dissolved in the liquid bridge 4. The liquid bridge 4 is formed in an atmospheric pressure environment. The volume of the liquid bridge 4 is minutely small and is approximately 1×10-12 mL. The liquid bridge 4 is located in part of the surface of the solid specimen 3. The dimensions of the part of the surface of the solid specimen 3 is approximately 1×10-8 m2.

When the probe 1 moves away from the solid specimen 3 due to the vibration, liquid that forms the liquid bridge 4 moves closer to the ion entrapment unit 7 including the ion extraction electrode electrically connected to the voltage applying apparatus 18. At that time, the liquid moves to the side surface of the probe 1 adjacent to the ion entrapment unit 7 to form the Taylor cone 5 due to the potential difference between the electric potential of the liquid having the voltage applied thereto and the electric potential of the ion extraction electrode having the voltage applied by the voltage applying apparatus 18 (preferably 0.1 kV or higher and 10 kV or lower and, more preferably, 3 kV or higher and 5 kV or lower). As used herein, the term "side surface" refers to a portion of the probe 1 in which the electrospray occurs. In FIG. 1, the Taylor cone 5 is formed on a continuous surface that forms the long axis direction of the probe 1. However, since this location is influenced by, for example, the electric field generated between the ion entrapment unit 7 and the liquid and the wettability of the probe 1 with the liquid, the Taylor cone 5 may be formed at a location that includes a surface other than the above-described surface.

The magnitude of the electric field increases in the top end portion of the Taylor cone 5 and, thus, electrospray is generated from the mixed solution. Accordingly, fine charged liquid droplets 6 are generated. By setting the magnitude of the electric field to an appropriate value, Rayleigh breakup of the charged liquid droplets occurs and, thus, ions of a particular component can be generated. The charged liquid droplets and the ions are led to the ion entrapment unit 7 by the airflow and the electric field. At that time, in order to increase the electric field in the vicinity of the solvent that forms the Taylor cone, it is desirable that vibration of the probe 1 include the motion to move close to the ion entrapment unit 7.

Note that the term "Rayleigh breakup" refers to a phenomenon that when the fine liquid droplets 6 reach the Rayleigh limit, excessive charge in the charged liquid droplets are released in the form of secondary liquid droplets. It is known that liquid forms a Taylor cone. Electrospray including charged liquid droplets is generated from the top end portion of the Taylor cone. For a period of time for which Rayleigh breakup occurs, a component contained in the charged liquid droplets turns into gas-phase ions. In addition, a threshold voltage Vc for the occurrence of the electrospray is given as follows:

$$Vc=0.863(\gamma d/\epsilon 0)^{0.5}$$

where γ denotes the surface tension of the liquid, d denotes the distance between the liquid and the ion extraction electrode, and ϵ0 denotes the permittivity of vacuum (refer to J. Mass Spectrom. Soc. Jpn. Vol. 58, 139-154, 2010).

To evaporate the solvent from the charged liquid droplets generated through the electrospray and generate ions, the ion entrapment unit 7 is heated at a particular temperature between a room temperature and several hundred degrees. In addition, a voltage is applied to the ion entrapment unit 7. At that time, to generate an appropriate electric field that generates ions, it is necessary to adjust the voltage that is applied to the liquid by the voltage applying apparatus 18 serving as an electric field generating unit and the voltage that is applied to the ion extraction electrode by the voltage applying apparatus 18. Examples of the voltage applied by the voltage applying apparatus 12 include a DC voltage, an AC voltage, a pulse voltage, zero volt, and any desired combinations thereof. Note that the electric field for generating ions is determined by the electric potential applied to the electrically conductive portion of the probe 1, the electric potential of the ion entrapment unit 7, and the distance between the liquid and the ion entrapment unit 7. Accordingly, these electric potentials and distance need to be set so that an appropriate electric field is generated in accordance with the type of substance to be ionized and the type of solvent.

Subsequently, the ions are introduced into the mass spectrometry unit 17 connected to the ion entrapment unit 7 through a differential exhaust system, and the mass-to-charge ratio of the ions is measured in the mass spectrometry unit 17. Any one of a quadrupole mass spectrometer, a time-of-flight mass spectrometer, a magnetic sector mass spectrometer, an ion-trap mass spectrometer, and an ion-cyclotron mass spectrometer can be used as the mass spectrometry unit 17. In addition, by measuring a correlation between the mass-to-charge ratio (mass number/charge number) (hereinafter, referred to as "m/z") of the ions and the amount of generated ions, the mass spectrum can be obtained.

Furthermore, to fix the specimen onto the substrate and ionize the specimen, the coordinates of the position of a portion of the specimen to be ionized can be controlled by changing the position of the XY stage 8 using the specimen stage control device 10. Still furthermore, by associating the coordinates of the ionized positions (positional information) with the obtained mass spectra, the two-dimensional distribution of the mass spectrum can be obtained. Data obtained using this technique is three-dimensional data containing the coordinates (an X coordinate and a Y coordinate) of the ionized position and the mass spectrum. After the ionization and the mass spectrum acquisition are performed at different positions, the amount of ions having a desired mass-to-charge ratio is selected, and the distribution thereof is displayed. In this manner, a mass image can be obtained for each of the components, and the distribution of a particular component across the surface of the specimen can be captured. The specimen can be moved so that the liquid bridge 4 formed by the probe 1 scans a desired plane of the solid specimen 3 to be measured.

The image forming unit 22 identifies a portion of the surface of the solid specimen 3 to be ionized. That is, the image forming unit 22 identifies a portion of the surface of the solid specimen 3 to be analyzed by the mass spectrometry apparatus. Thereafter, the image forming unit 22 can move the solid specimen 3 using the XY stage 8 and the Z stage 9 so that the substance contained in the portion is included in the Taylor cone 5 via the liquid bridge 4.

Each of the image forming unit 22 and the displacement calculation device 23 is formed from, for example, a computer.

The image forming unit 22 receives at least a signal output from the ion counter 21 and outputs signals to the specimen stage control apparatus 10.

The displacement calculation device 23 receives at least a signal output from the displacement sensor 16 and outputs signals to the voltage applying apparatus 12 and the specimen stage control apparatus 11.

When the probe 1 scans the surface of the solid specimen 3, a movement process of the probe 1 and a process of ionization and measurement of the number of ions are alternately performed. At that time, by setting up the image forming unit 22 and the displacement calculation device 23, scanning of the probe 1 can be performed after a predetermined number of ionization processes and measurements of the number of ions are performed. In this manner, the quantitative capability of the three-dimensional data can be increased and, thus, the amounts of ions in the mass images at all the coordinates can be quantitatively compared with one another. Any scanning unit that allows the probe 1 to relatively scan the surface of the specimen can be used as the scanning unit of the probe 1. That is, either the above-described scanning unit that moves the specimen stage with the position of the probe 1 fixed or a scanning unit that moves the probe 1 with the position of the specimen stage fixed can be employed.

According to the present exemplary embodiment, the image forming unit 22 of the mass spectrometry apparatus generates image information used for displaying, as an image, the distribution of a substance contained in the solid specimen 3 from information regarding the position of the solid specimen 3 to be analyzed (a portion of the solid specimen 3 to be analyzed) in the image forming unit 22 and the mass information (the mass spectrum) obtained from the ion counter 21 according to the above-described present exemplary embodiment.

According to the present exemplary embodiment, the imaging system includes the mass spectrometry apparatus according to the above-described present exemplary embodiment and an image display unit.

The image information output from an output sub-unit of the image forming unit 22 is output to an output unit (the display unit 24, such as a flat panel display) connected to the image forming unit 22. Thus, the image is displayed. The image information may be two-dimensional image information or three-dimensional image information. The output unit may be a unit that prints an image (e.g., a printer).

As described above, a substance that is dissolved from a particular position of the solid specimen 3 into the liquid bridge 4 can be detected on the basis of the result of mass spectrometry at the particular position of the solid specimen 3. By changing the particular position in the surface of the solid specimen 3 and performing mass spectrometry at the position, mass spectrum data can be obtained. By combining the mass spectrum data with the information regarding the particular position, the distribution of the substance in the solid specimen 3 (in most cases, the distribution of the substance across the surface of the solid specimen 3) is obtained and is displayed (superimposed) as an image.

In addition to the position of the substance, the amount of the substance is displayed. The amount of the substance is represented by a color or the brightness of the image. In addition, if multiple substances contained in the solid specimen 3 are analyzed, the substances can be identified by using different colors, and the amount thereof can be represented by the brightness thereof. Furthermore, a pre-captured microscope image of the solid specimen 3 may be superimposed on the image regarding the mass of the solid specimen 3 and may be displayed.

Second Exemplary Embodiment

A second exemplary embodiment using a synchronization circuit is described below.

To synchronize the timing of vibration of the probe 1 and the timing of vibration of the stage with the gate signal, it is desirable to use a circuit for generating a synchronous signal that synchronizes the vibration control signal of the probe 1 with the vibration control signal of the stage or that synchronizes the output signal of the displacement sensor 16 with the output signal of the displacement sensor 20.

Figure 5:
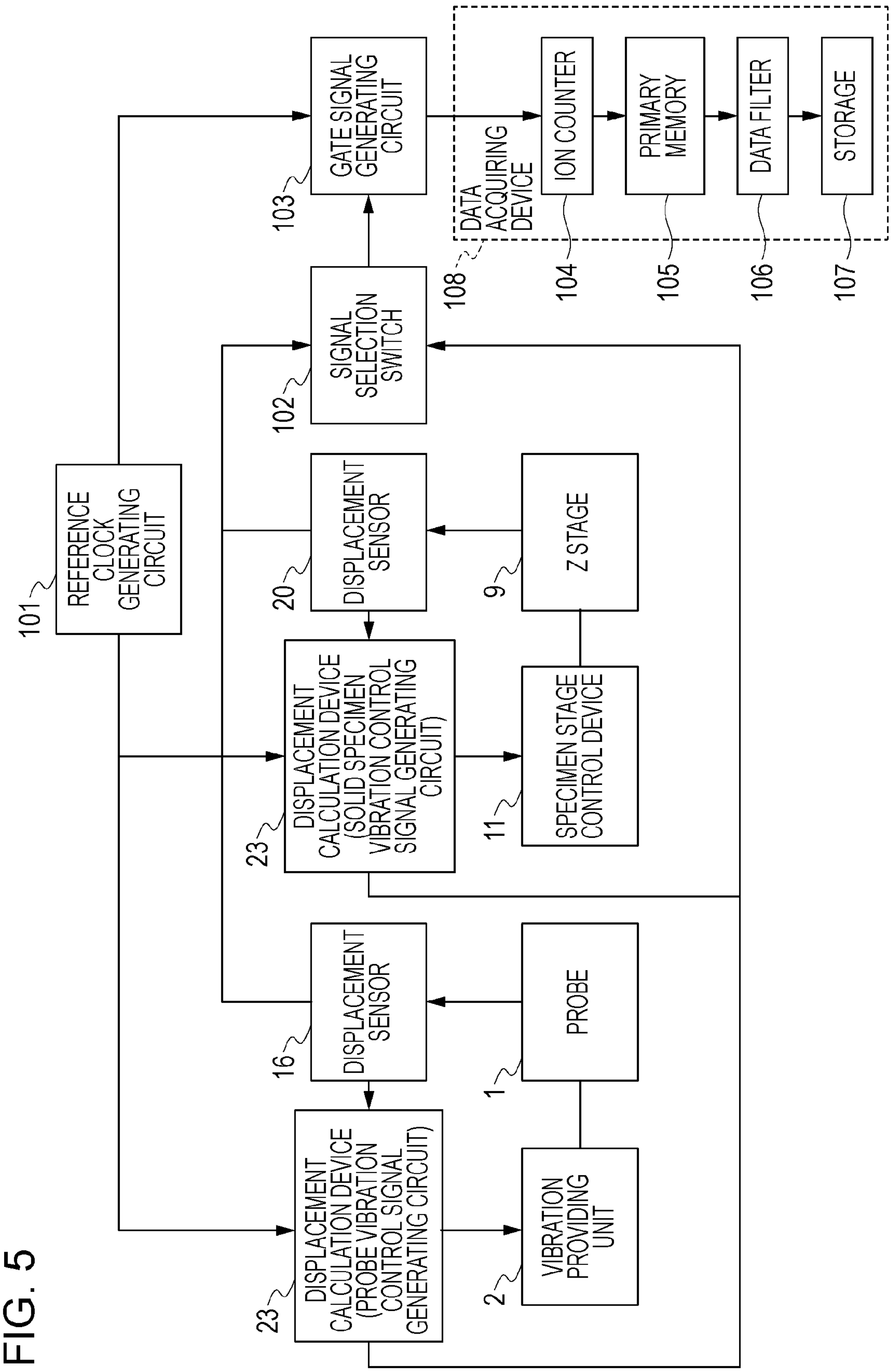
FIG. 5 is a schematic illustration of a synchronization circuit and apparatuses controlled by the synchronization circuit in a third drive mode of an ionization device according to a second exemplary embodiment.

FIG. 5 illustrates an example of a synchronization circuit capable of performing such control, a device controlled by the output signal output from the synchronization circuit, and a device that generates an input signal input to the synchronization circuit.

As illustrated in FIG. 5, the synchronization circuit includes a reference clock generating circuit 101, the displacement calculation device 23, a signal selection switch 102, and a gate signal generating circuit 103. The displacement calculation device 23 includes a circuit for generating a vibration control signal for a probe and a circuit for generating a vibration control signal for the solid specimen.

In addition, the apparatuses that are controlled by the output signal output from the synchronization circuit include the voltage applying apparatus 12, the vibration providing unit 2, the probe 1, the specimen stage control device 11, the Z stage 9, and a data acquiring device 108. The data acquiring device 108 is formed from an ion counter 104, a primary memory 105, a data filter 106, and a storage 107.

Furthermore, the apparatuses that generate an input signal input to the synchronization circuit include the displacement sensor 16 and the displacement sensor 20.

To achieve the synchronization circuit according to the present exemplary embodiment, a field programmable gate array (FPGA) or an application specific integrated circuit (ASIC) can be used. By using a FPGA or an ASIC, a plurality of control circuits (23, 101, 102, and 103) can be implemented in an integrated circuit. Thus, the control timing of the control circuits can be accurately adjusted at high speed.

The displacement calculation devices 23 measure the frequencies, the amplitudes, and the phases of vibration of the probe 1 and the stage using the electric signal output from the displacement sensor 16 and the displacement sensor 20. In addition, the displacement calculation devices 23 output signals for controlling the vibration of the probe 1 and the Z stage 9 to the voltage applying apparatus 12 and the specimen stage control device 11. The voltage signal is one of a triangle wave signal, a square wave signal, a sine wave signal, and a cosine wave signal. The displacement calculation device 23 for vibration of the probe 1 includes a circuit that generates a signal for controlling vibration of the probe 1, and the displacement calculation device 23 for vibration of the Z stage 9 includes a circuit that generates a signal for controlling vibration of the Z stage 9. The displacement calculation devices 23 may be provided as independent circuits for the probe 1 and the Z stage 9. Alternatively, the displacement calculation devices 23 may be provided in the same circuit board.

Each of the displacement calculation devices 23 includes a feedback circuit that makes the phase difference between each of a signal output from the displacement sensor 16 and the displacement sensor 20, which correspond to the actual vibration of the probe 1 and the Z stage 9, and a voltage signal generated on the basis of a reference clock generated by the reference clock generating circuit 101 zero. When the feedback circuit operates, the probe 1 and the Z stage 9 vibrate at a constant frequency and with a constant phase difference. Such a drive mechanism is generally referred to as a phase locked loop (PLL). In addition, by providing a delay compensation circuit in the PLL circuit, a voltage signal having a desired delay time with respect to the reference signal can be generated.

The output signals output from the displacement sensor 16, the displacement sensor 20, and the displacement calculation device 23 are also input to the signal selection switch 102. The signal selection switch 102 selects one of the output signals output from the displacement sensor 16 and the displacement calculation device 23 and inputs the selected signal to the gate signal generating circuit 103.

The gate signal generating circuit 103 can use the input signal as a reference signal. Thus, the gate signal generating circuit 103 can be set up so as to output a particular voltage signal for a period of time for which the voltage value of the reference signal exceeds a predetermined threshold value. In addition, a desired delay time can be set so that the output time of the voltage is extended from the period of time for which the voltage value of the reference signal exceeds a predetermined threshold value forward and backward in the time direction. According to the present exemplary embodiment, ionization occurs during a period of time for which the reference signal exceeds the threshold value. However, if the polarity of each of the output signals of the displacement sensors and the displacement calculation device 23 is reversed, the voltage signal may be output for a period of time for which the voltage value of the reference signal is less than the threshold value. The voltage signal is one of a positive voltage, a negative voltage, and 0 volt.

The output signal generated by the gate signal generating circuit 103 is input as the gate voltage signal of the ion counter 104. Setup is performed so that the ion counter 104 operates for a period of time for which the gate signal is being output.

A method for storing the voltage signal output from the ion counter 104 as digital data is described below. The signal output from the ion counter 104 is analog-to-digital (A/D) converted and is stored in the primary memory 105 for a predetermined period of time. The measurement data corresponding to the type of ion to be measure are selected and are stored in the storage 107 formed from a hard disk drive (HDD) or a solid state drive (SSD). The process for selecting the data is performed in the data filter 106 by a computer program. Thereafter, the primary memory 105 is overwritten with new data. Alternatively, the new data is written in another area. By selecting data and storing the data in the storage 107, the total amount of data can be reduced. If ions to be measured are predetermined, the method can be applied. In contrast, if ions that are not predetermined are detected, all the data obtained by the data filter 106 can be stored in the storage 107.

Note that the above-described synchronization method is employed when both the probe 1 and Z stage 9 vibrate. However, when one of the probe 1 and the Z stage 9 vibrates, a gate signal is generated by stopping the displacement calculation device 23 for vibration of the probe 1 or the Z stage 9 and the downstream control device and inputting the output signals output from the driven displacement calculation device 23 and displacement sensor to the signal selection switch 102.

Third Exemplary Embodiment

According to a third exemplary embodiment, the ionization device includes a holding table for holding a specimen, a probe for identifying a portion of the specimen to be ionized, an ion extraction electrode for extracting ions generated by ionizing the specimen, a liquid supplying unit for supplying liquid to form a liquid bridge between the specimen and the probe, and a voltage applying unit for applying a voltage to a portion of the probe between a portion in contact with the liquid bridge and the ion extraction electrode.

In addition, the ionization device includes a vibrating unit that causes at least the probe to repeatedly move close to and away from the holding table. The vibrating unit causes the probe to vibrate at one of at least two frequencies, one of which is the frequency for forming a liquid bridge and the other is a frequency higher than that frequency.

Figure 6:
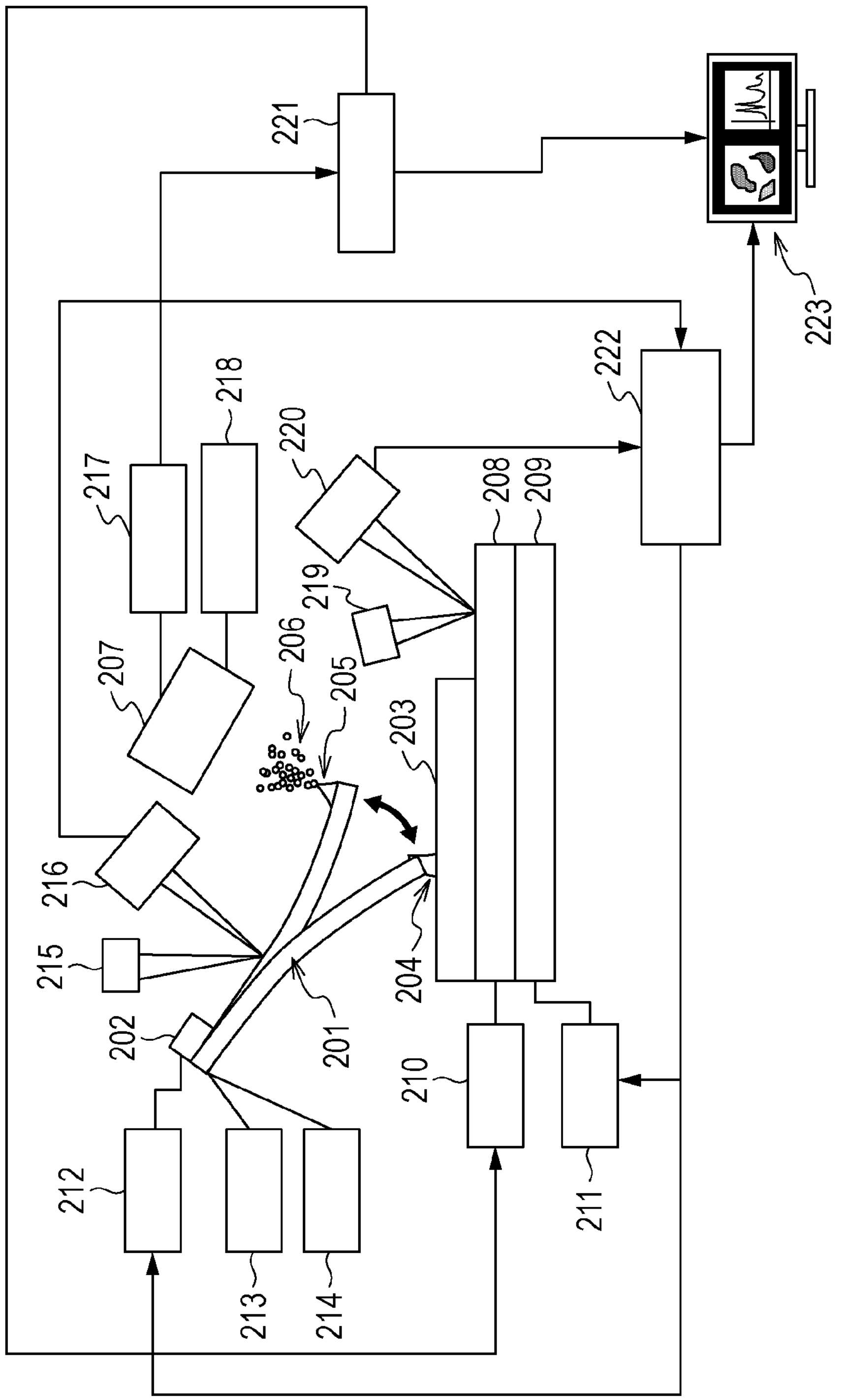
FIG. 6 is a schematic illustration of an imaging system including the ionization device according to the third exemplary embodiment.

FIG. 6 is a schematic illustration of an imaging system including the ionization device according to the third exemplary embodiment. The imaging system includes a probe 201 having a flow passage therein, where the flow passage allows liquid to flow through, a probe vibrating unit 202 that vibrates the probe 201, a solid specimen 203, a liquid bridge 204 formed between the probe 201 and the solid specimen 203, a Taylor cone 205, charged fine liquid droplets 206, an ion entrapment unit 207 having an ion extraction electrode for entrapping ions into a mass spectrometry apparatus, an XY stage 208 serving as a holding table that holds the solid specimen 203, a Z stage 209 for moving the solid specimen 203 serving as a holding table vibrating unit in the vertical direction (a Z direction) in FIG. 6, specimen stage control units 210 and 211 serving as signal transmitters for transmitting vibration signals to the stages, a voltage applying unit 212, a liquid supply unit 213 that supplies liquid to the probe 201, a voltage applying unit 214, light sources 215 and 219, displacement sensors 216 and 220, a mass spectrometry unit 217, a voltage applying unit 218, an image information generating unit 221, a displacement calculation unit 222, and a display unit 223.

According to the present exemplary embodiment, liquid supplied from the liquid supply unit 213 forms the liquid bridge 204 between the solid specimen 203 and the probe 201. The solid specimen 203 is an object formed from an object to be measured that is placed on one of a metal substrate, an insulating material substrate, and a semiconductor substrate. The object to be measured requires that the component distribution in the microregion of, for example, a biological tissue or bodily fluid is measured. In addition, part of the liquid that forms the liquid bridge 204 is turned into charged fine liquid droplets 206 by the vibration of the probe 201 and an electric field generated by the voltage applying unit 214 and the voltage applying unit 218, where the voltage applying unit 214 applies a voltage between a portion of the probe 201 in contact with the liquid bridge 4 and the ion extraction electrode. Thus, the charged fine liquid droplets 206 move away from the probe 201. The solvent components of the charged fine liquid droplets 206 that move away from the probe 201 are evaporated and, thus, the component to be measured can be entrapped in the ion entrapment unit 207 in the form of ions. That is, according to the present exemplary embodiment, the probe 201 functions as a supply unit for supplying liquid onto the substrate and an acquiring unit of the substance, a transport unit for transporting the liquid to a position that is suitable for ionization, and a forming unit for forming a Taylor cone 205 for ionization.

The liquid supply unit 213 supplies the solvent for dissolving a component to be analyzed contained in the solid specimen 203 or mixed solution of a component to be analyzed and the solvent (hereinafter, the solvent and the mixed solution are collectively and simply referred to as "liquid"). The liquid supplied from the liquid supply unit 213 is led to the flow passage in the probe 201. At that time, a voltage is applied to the liquid by the voltage applying unit 214. The voltage applied to the liquid is one of a DC voltage, an AC voltage, a pulse voltage, and zero volt.

The configurations of the probe 201 and a connection pipe that connects the probe 201 to the liquid supply unit 213 are similar to those of the above-described exemplary embodiments.

The liquid supplied from the liquid supply unit 213 is supplied from the top end of the probe 201 onto the solid specimen 203. In this manner, a minutely small amount of the substance contained in the solid specimen 203 can be ionized in an atmospheric pressure environment.

In the above-described configuration according to the present exemplary embodiment, the probe 201 is also vibrated. Note that according to the present exemplary embodiment, the vibration of the probe 201 is the periodic motion of the probe 201 such that the position of the top end of the probe 201 adjacent to the solid specimen 203 is spatially displaced. In particular, it is desirable that the probe 201 is bending-vibrated in a direction crossing the axis direction of the probe 201. In addition, it is desirable that the probe 201 be vibrated due to mechanical vibration provided from the probe vibrating unit 202.

The frequency and amplitude of the vibration of the probe 201 may be set to desired values. The values may be constant values or modulated values. For example, by varying a voltage value or a frequency value output from the voltage applying unit 212 that is electrically connected to the probe vibrating unit 202, the amplitude and frequency of the vibration of the probe 201 can be adjusted to the desired values.

The Z stage 209 is used to bear the solid specimen 203 and vibrate the solid specimen 203 in a direction perpendicular to the surface of the solid specimen 203. The Z stage 209 can vibrate on the basis of a control signal output from the specimen stage control unit 211 connected to the Z stage 209. The frequency and amplitude of the vibration may be set to desired values. The values may be constant values or modulated values. In such a case, by varying a voltage value or a frequency value output from the specimen stage control unit 211, the amplitude and frequency of the vibration can be adjusted to the desired values.

Like the first exemplary embodiment, the light source 215 and the displacement sensor 216 serve as a displacement measuring unit used to measure the vibration of the probe 201.

Similarly, the light source 219 and the displacement sensor 220 serve as a displacement measuring unit used to measure the vibration of the XY stage 208 and the Z stage 209.

The electric signals output from the displacement sensor 216 and the displacement sensor 220 are input to the displacement calculation unit 222. The frequency, the amplitude, and the phase of the vibration of the probe and the stage can be measured using the electric signals.

According to the present exemplary embodiment, a vibration unit that vibrates the probe is independent from a vibration unit that vibrates the specimen. Accordingly, the following three vibratory modes can be provided as a drive mode.

That is, the three vibratory modes are (D) a mode for vibrating the probe, (E) a mode for vibrating the solid specimen, and (F) a mode for independently vibrating the probe and the solid specimen at the same time.

FIG. 6 illustrates the drive modes (D) and (F). In the drive mode (E), provision of a signal from the voltage applying unit 212 to the probe vibrating unit 202 is stopped, and the probe 201 is located in close proximity to the solid specimen 203 or is in contact with the solid specimen 203.

In the drive mode (D) in which only the probe 201 is vibrated, a signal is input to the probe vibrating unit 202, and provision of a signal to the specimen stage control unit 211 is stopped. As a result, the probe 201 vibrates, and the vibration of the Z stage 209 is stopped.

In the drive mode (E) in which the solid specimen 203 is vibrated, provision of a signal to the probe vibrating unit 202 is stopped, and a signal is input to the specimen stage control unit 211. As a result, the probe 201 is stopped, and the Z stage 209 vibrates. If the probe 201 is in contact with a surface of the solid specimen 203, vibration of the Z stage 209 propagates to the probe 201. Accordingly, the probe 201 can be vibrated. Even in such a case, the drive mode (E) is applied.

In the drive mode (F) in which the probe 201 and the solid specimen 203 are independently vibrated, a signal is input to the probe vibrating unit 202. At the same time, a signal is input to the specimen stage control unit 211. As a result, the probe 201 and the Z stage 209 independently vibrate.

Figure 7A:
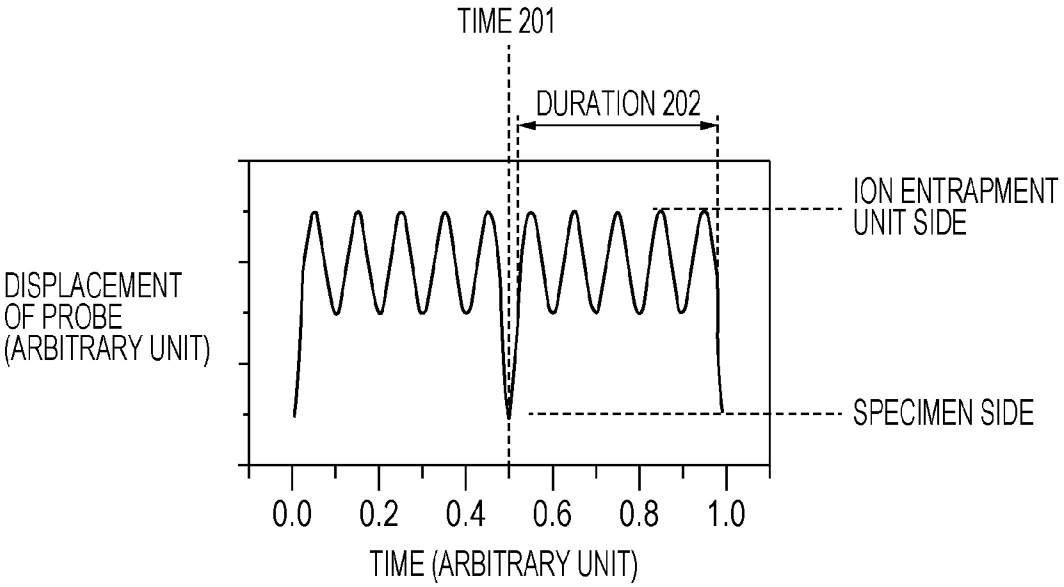
FIGS. 7A and 7B are timing diagrams of the operation timing of apparatuses in first and second drive modes of the ionization device according to the third exemplary embodiment.
Figure 7B:
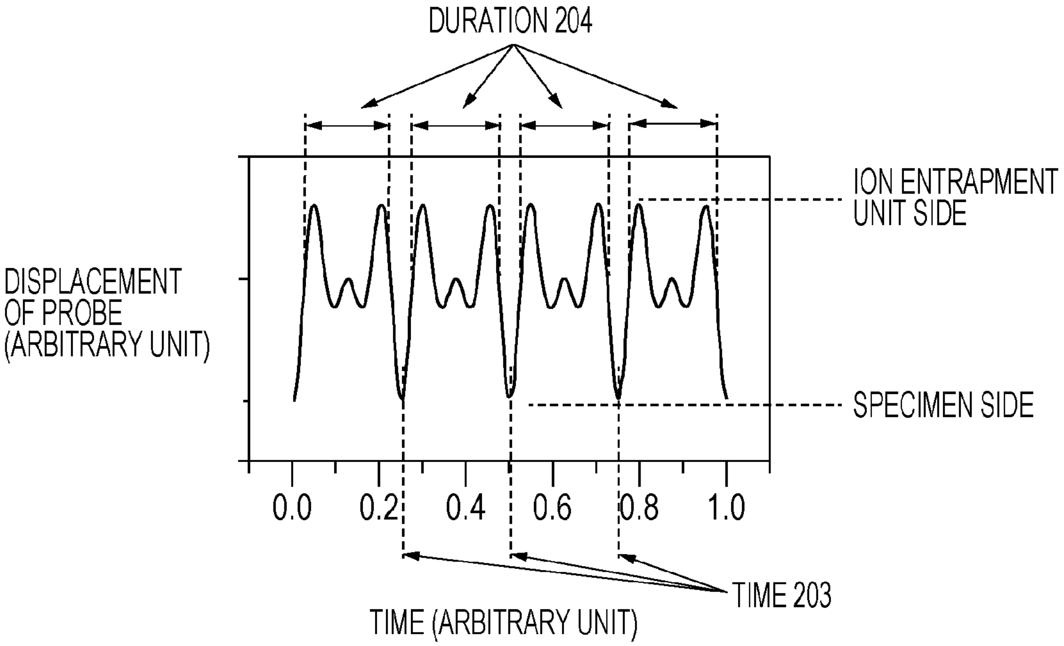

If the drive modes (D) and (E) are selected, the amplitudes of vibration of the probe 201 and the Z stage 209 are modulated, respectively. FIGS. 7A and 7B illustrate examples of the amplitude modulation in the drive modes (D) and (E).

When the drive mode (D) is selected, the amplitude of vibration corresponds to a time variation of the input signal input to the probe 201. When the drive mode (E) is performed, the amplitude of vibration corresponds to a time variation of the input signal input to the Z stage 209. There is a correspondence between the input signal and the amplitude of each of the probe 201 and the Z stage 209. Accordingly, by measuring the input signal, the amplitude of each of the probe 201 and the Z stage 209 can be estimated.

FIGS. 7A and 7B illustrate different input signal patterns. In FIG. 7A, a waveform obtained by combining a sine wave and a square wave is illustrated. In FIG. 7B, a waveform obtained by combining a sine wave and a triangle wave is illustrated. In such a case, a sine wave is used as a fundamental vibration signal, and a square wave or a triangle wave is used as a vibration signal for modulation. Thus, the combined signal is generated. To generate the combined signal, the two types of signal are multiplied together, and the product is used as the combined signal. However, addition, subtraction, or division and any combination thereof can be employed to generate the combined signal. The frequency of the fundamental vibration signal is set so as to be the same as the resonance frequency of the probe 201 or the Z stage 209. In addition, the frequency of the vibration signal for modulation is set so as to be the same as the frequency used for generating the liquid bridge 204. It is desirable that two types of signal be selected from among a triangle wave signal, a sine wave signal, a square wave signal, and a saw-tooth wave signal as the fundamental vibration signal and the vibration signal for modulation.

In addition, it is desirable that the frequency of one of the two vibration signals be an integral multiple (2 or more) of the frequency of the other vibration signal, and the phase difference between the vibration indicated by one of the vibration signals and the vibration indicated by the other vibration signal be 0 or 180 degrees.

That is, according to the present exemplary embodiment, the vibrating unit is a probe vibrating unit for vibrating the probe. A configuration to reduce the frequency used for forming the liquid bridge to an integer fraction of the frequency of vibration of the probe by modulating the amplitude of vibration of the probe is provided.

Setup is made so that at times 201 and 203 at which the absolute value of the amplitude is maximized, the probe 201 is located so as to be the closest to the solid specimen 203. In a time window around each of the times 201 and 203, the liquid bridge 204 is formed between the probe 201 and the solid specimen 203, and ionization is performed. In contrast, in the durations 202 and 204 for which the amplitude is small, the liquid bridge 204 is not formed between the probe 201 and the solid specimen 203 and, thus, the component of the solid specimen is not ionized. In this manner, by adjusting the modulation frequency of the vibration amplitude, the number of formation processes of the liquid bridge 204 can be controlled. The liquid bridge 204 is formed at the time 201 and the times 203, and the component contained in the surface of the solid specimen 203 is dissolved in the liquid deposited to the top end of the probe 201. The component is ionized in the durations 202 or the durations 204. Since the solvent continuously flows into the probe 201 even in the duration 202 and the duration 204, the liquid deposited onto the top end of the probe 201 is diluted by the solvent. The component contained in the surface of the solid specimen 203 is ionized over time and, thus, the component in the liquid disappears. In addition, the top end of the probe 201 is cleaned by the solvent that newly flows into the probe 201. As described above, by modulating the vibration amplitude, each of the duration in which the liquid bridge 204 is formed and the duration in which the liquid bridge 204 is not formed can be set to a desired value. As a result, unlike Tapping-mode SPESI described in Non-patent literature above, carry-over can be prevented.

Figure 8:
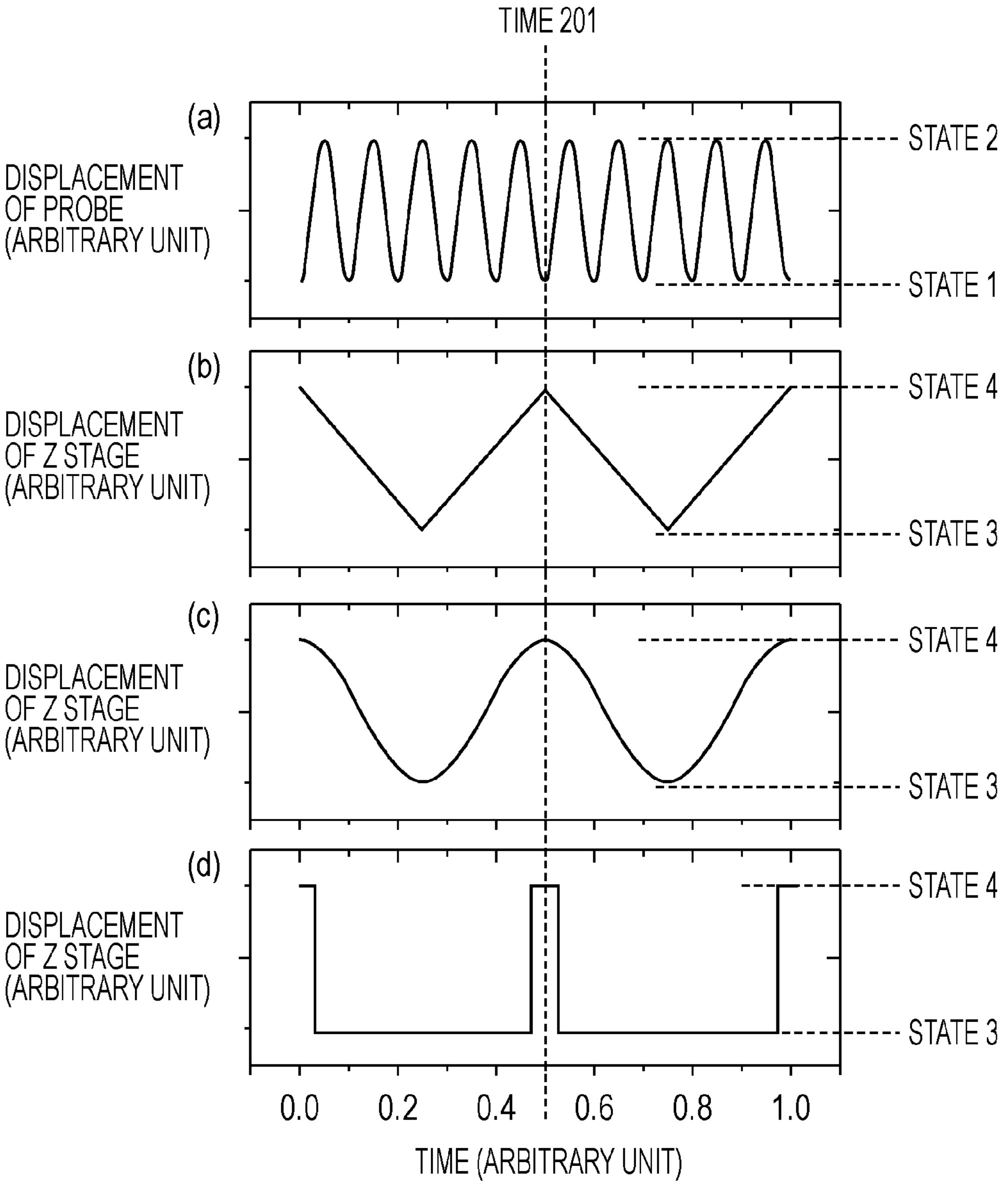
FIG. 8 is a timing diagram of the operation timing of apparatuses in a third drive mode of the ionization device according to the third exemplary embodiment.

If the drive mode (F) is selected, two types of vibration signal (i.e., a signal for vibration of a probe transmitted to the probe vibrating unit 202 and a signal for vibration of a holding table transmitted to the holding table vibrating unit are employed. Thus, the probe 201 and the Z stage 209 vibrate at their own frequencies. At that time, it is desirable that the frequency of vibration of the probe 201 be an integral multiple (2 or more) of the frequency of the Z stage 209, which is the vibrating unit of the holding table, and the phase difference between the vibration of the probe 201 and the vibration of the Z stage 209 be 0 or 180 degrees. FIG. 8 illustrate an example of the vibration signals input to the probe 201 and the Z stage 209.

In this example, signals input to the specimen stage control unit 211 and the voltage applying unit 212 are illustrated. Note that in this example, the frequency of vibration of the probe 201 is 5 times the frequency of vibration of the Z stage 209. Accordingly, the Z stage 209 moves closest to the probe 201 once every five vibrations of the probe 201. A waveform chart (a) of FIG. 8 illustrates the input signal input to the probe 201. Waveform charts (b), (c), and (d) of FIG. 8 illustrate examples of the input signals input to the Z stage 209. In the waveform chart (a) of FIG. 8, the ordinate is correlated with the position of the probe 201 in the Z direction. As can be seen from the waveform chart (a) in FIG. 8, the probe 201 vibrates between a state 1 in which the probe 201 is the closest to the solid specimen 3 and a state 2 in which the probe 201 is the closest to the ion entrapment unit 207. The ordinates in waveform charts (b), (c), and (d) of FIG. 8 are correlated with the position of the surface of the solid specimen 203 in the Z direction. As can be seen from the waveform charts (b), (c), and (d) of FIG. 8, the probe 201 vibrates between a state 4 in which the probe 201 is the closest to the solid specimen 3 and, thus, a liquid bridge is formed and a state 3 in which the solid specimen 203 moves away from the probe 201 and, thus, the liquid bridge 204 disappears.

In a time window around the time 201 at which the probe 201 is located closest to the solid specimen 203, a liquid bridge is formed between the probe 201 and the solid specimen 203, and ionization occurs. In the other time window, a liquid bridge is not formed and, thus, the component of the solid specimen is not ionized. As described above, by independently adjusting the frequencies of vibration of the probe 201 and the Z stage 209, each of the duration in which a liquid bridge is formed and the duration in which a liquid bridge is not formed can be set to a desired value. Thus, carry-over can be prevented. According to the present exemplary embodiment, in addition to advantages that are the same as in the above-described drive modes (D) and (E), an advantage that the absolute value of the distance between the probe 1 and the Z stage 9 is increased due to vibration of both the probe 201 and Z stage 209 can be provided. Note that it is desirable that the present exemplary embodiment be applied when the irregularity of the surface profile of the solid specimen 203 is significant and, thus, the vibration amplitude of the probe 201 is increased so that formation of the liquid bridge 204 and ionization are stably performed. While the present exemplary embodiment has been described with reference to the control signals of the specimen stage control unit 211 and the voltage applying unit 212 being a triangle wave, a sine wave, or a square wave, the waveform is not limited thereto. For example, the waveform may be a sawtooth waveform or a waveform obtained by combining a triangle wave, a sine wave, a square wave, and a sawtooth wave illustrated in FIG. 7B.

In each of the drive modes (D), (E), and (F), the vibration state is measured by using the displacement calculation unit 122. Thereafter, control signals are output from the displacement calculation unit 222 to the specimen stage control unit 211 and the voltage applying unit 212 so that a desired vibration state is obtained. At that time, by providing a feedback circuit in the displacement calculation unit 222, a stable vibration condition can be automatically maintained. In addition, a slight timing shift may occur between vibration of the probe 201 and vibration of the Z stage 209 due to, for example, electrical wiring between the parts and the electric capacitances of the parts illustrated in FIG. 6. In such a case, by providing a delay circuit that controls the timing in the feedback circuit, the timing shift between actual vibration of the probe 201 and a control signal and the timing shift between actual vibration of the Z stage 209 and a control signal can be compensated for.

According to the present exemplary embodiment, by using one of the drive modes (D), (E), and (F), the following processes are alternately performed: (i) a process to supply liquid from a probe onto a solid specimen and form a liquid bridge containing the substance between the probe and the solid specimen, and (ii) a process to generate an electric field for generating ions between the conductive portion of the probe in contact with the liquid and an ion extraction electrode. That is, by changing the position of one end of the probe that vibrates, an optimum positional relationship can be set in each of the processes (i) and (ii). In terms of the timing of formation of the liquid bridge, in the drive mode (D), the liquid bridge is formed at a frequency lower than the resonance frequency of the probe. In the drive mode (E), the liquid bridge is formed at a frequency lower than the resonance frequency of the Z stage. In the drive mode (F), the liquid bridge is formed at a frequency lower than each of the probe and the Z stage.

By intermittently or continuously providing the liquid from the probe 201, the liquid bridge 204 is formed.

When the probe 201 moves away from the solid specimen 203 due to the vibration, liquid that forms the liquid bridge 204 moves closer to the ion entrapment unit 207 including the ion extraction electrode electrically connected to the voltage applying unit 218. At that time, the liquid moves to the side surface of the probe 201 adjacent to the ion entrapment unit 207 to form the Taylor cone 205 due to the potential difference between the electric potential of the liquid having the voltage applied thereto and the electric potential of the ion extraction electrode having the voltage applied by the voltage applying unit 218 (preferably 0.1 kV or higher and 10 kV or lower and, more preferably, 3 kV or higher and 5 kV or lower).

The magnitude of the electric field increases in the top end portion of the Taylor cone 205 and, thus, electrospray is generated from the mixed solution. Accordingly, fine charged liquid droplets 206 are generated.

The ion entrapment unit 207 is heated at a particular temperature between a room temperature and several hundred degrees. In addition, a voltage is applied to the ion entrapment unit 207.

Subsequently, the ions are introduced into the mass spectrometry unit 217 connected to the ion entrapment unit 207 through a differential exhaust system, and the mass-to-charge ratio of the ions is measured in the mass spectrometry unit 217.

In addition, by measuring a correlation between the mass-to-charge ratio (mass number/charge number) of the ions and the amount of generated ions, the mass spectrum can be obtained.

According to the present exemplary embodiment, unlike the case in which one of a probe and a Z stage is vibrated with a constant amplitude and at a constant frequency and, in addition, the number of vibrations per unit time is the same as the number of formation processes of the liquid bridge, carry-over can be prevented.

In addition, to fix a specimen onto the substrate and ionize the specimen, the coordinates of the position of a portion of the specimen to be ionized can be controlled by changing the position of the XY stage 208 using the specimen stage control unit 210. Furthermore, by associating the coordinates of the ionized positions (positional information) with the obtained mass spectra, the two-dimensional distribution of the mass spectrum can be obtained. Data obtained using this technique is three-dimensional data containing the coordinates (an X coordinate and a Y coordinate) of the ionized position and the mass spectrum. After the ionization and the mass spectrum acquisition are performed at different positions, the amount of ions having a desired mass-to-charge ratio is selected, and the distribution thereof is displayed. In this manner, a mass image can be obtained for each of the components, and the distribution of a particular component across the surface of the specimen can be captured. The specimen can be moved so that the liquid bridge 204 formed by the probe 201 scans a desired plane to be measured.

Figure 9:
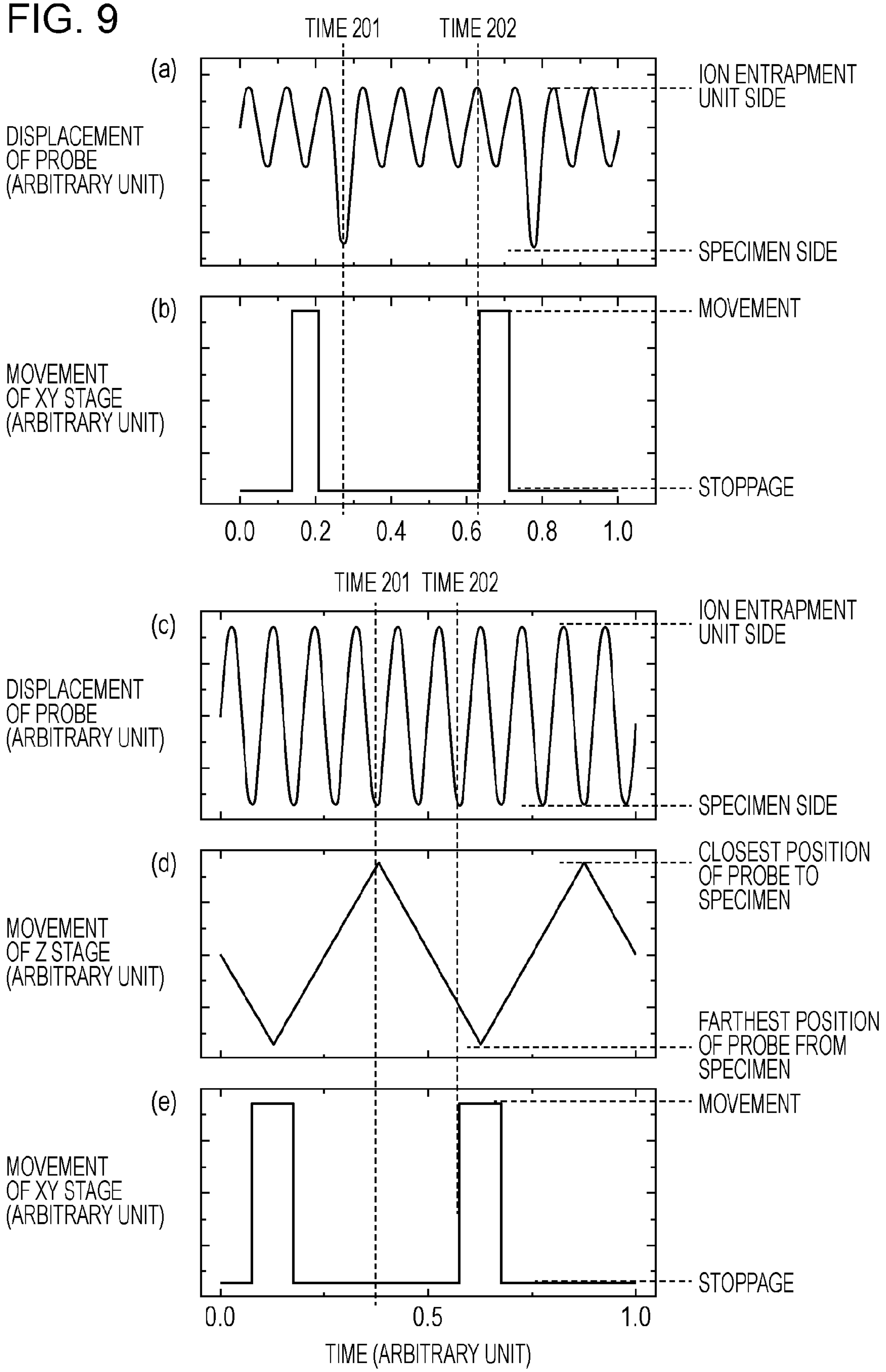
FIG. 9 is a timing diagram of the operation timing of apparatuses in the first to third drive modes of the ionization device according to the third exemplary embodiment.

Waveform charts (a) to (e) of FIG. 9 illustrate the timing of driving the probe 201, the Z stage 209, and the XY stage 208 in the drive modes (D), (E), and (F). The waveform chart (a) of FIG. 9 illustrates the pattern of an input signal input to the probe 201 or the Z stage 209 in the drive mode (D) or (E). The waveform chart (b) of FIG. 9 illustrates the pattern of a signal input to the XY stage 208 in the drive mode (D) or (E). As in FIGS. 7A and 7B, the liquid bridge 204 is formed in the time window around the time 201. Thereafter, the liquid bridge 204 disappears, and ionization occurs. Subsequently, at the time 202, a signal is input to the XY stage 208 and, thus, the position in the surface of the solid specimen 203 to be analyzed is moved.

The waveform chart (c) of FIG. 9 illustrates the pattern of an input signal input to the probe 201 in the drive mode (F). The waveform chart (d) of FIG. 9 illustrates the pattern of an input signal input to the Z stage 209 in the drive mode (F). The waveform chart (e) of FIG. 9 illustrates the pattern of an input signal input to the XY stage 208 in the drive mode (F). As in the waveform charts (a) to (d) of FIG. 8, the liquid bridge 204 is formed in the time window around the time 201. Thereafter, the liquid bridge 204 disappears, and ionization occurs. Subsequently, at the time 202, a signal is input to the XY stage 208 and, thus, the position in the surface of the solid specimen 203 to be analyzed is moved. By adjusting the time 202 so that the component dissolved in the liquid bridge 204 is ionized between the time 201 and the time 202 in this manner, carry-over in the liquid bridge 204 formed after the time 202 can be prevented.

The displacement calculation unit 222 identifies a portion of the surface of the solid specimen 203 to be ionized. That is, the displacement calculation unit 222 identifies a portion of the surface of the solid specimen 203 to be analyzed by the mass spectrometry unit 217. Thereafter, the displacement calculation unit 222 can move the solid specimen 203 using the XY stage 208 and the Z stage 209 so that the substance contained in the portion is included in the Taylor cone 205 via the liquid bridge 204. The displacement calculation unit 222 is formed from, for example, a computer. The displacement calculation unit 222 receives at least a signal output from the displacement sensor 216 and outputs signals to the voltage applying unit 212, the specimen stage control unit 210, and the specimen stage control unit 211.

According to the present exemplary embodiment, the image information generating unit 221 connected to the mass spectrometry unit 217 generates image information used for displaying, as an image, the distribution of a substance contained in the solid specimen 203 from information regarding the position of the solid specimen 203 to be analyzed (a portion of the solid specimen 203 to be analyzed) received from the displacement calculation unit 222 and the mass information (the information regarding the signal intensity of the mass spectrum) obtained from the mass spectrometry unit 217 according to the above-described present exemplary embodiment.

According to the present exemplary embodiment, the imaging system includes the mass spectrometry apparatus according to the above-described present exemplary embodiment as a mass spectrometry apparatus unit. The imaging system further includes the image information generating unit and the image display unit.

The image information output from an output sub-unit of the image information generating unit 221 is input to the display unit 223, such as a flat panel display, connected to the image information generating unit 221. Thus, the image is displayed. The image information may be two-dimensional image information or three-dimensional image information.

As described above, a substance that is dissolved from a particular position of the solid specimen 203 into the liquid bridge 204 can be detected on the basis of the result of mass spectrometry at the particular position of the solid specimen 203. By changing the particular position in the surface of the solid specimen 203 and performing mass spectrometry at the position, mass spectrum data can be obtained. By combining the mass spectrum data with the information regarding the particular position, the distribution of the substance in the solid specimen 203 (in most cases, the distribution of the substance across the surface of the solid specimen 203) is obtained and is displayed (superimposed) as an image.

In addition to the position of the substance, the amount of the substance is displayed. The amount of the substance is represented by a color or the brightness of the image. In addition, if multiple substances contained in the solid specimen 203 are analyzed, the substances can be identified by using different colors, and the amount thereof can be represented by the brightness thereof. Furthermore, a pre-captured microscope image of the solid specimen 203 may be superimposed on the image regarding the mass of the solid specimen 203 and may be displayed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-161331 filed Aug. 2, 2013, and No. 2013-183962 filed Sep. 5, 2013, which are hereby incorporated by reference herein in their entirety.

What is claimed is:

1. An ionization device comprising:

a holding table configured to hold a specimen to be ionized;

a probe configured to identify a portion of the specimen to be ionized;

an ion extraction electrode configured to extract ions obtained by ionizing the specimen;

a liquid supplying unit configured to supply liquid to between the specimen and the probe to form a liquid bridge between the specimen and the probe;

a vibrating unit configured to vibrate one of the probe and the holding table;

an electric field generating unit configured to generate an electric field between the probe and the ion extraction electrode; and a synchronization unit configured to perform at least one of the following two synchronization processes on the basis of vibration of one of the probe and the holding table:

(i) synchronizing a time at which ions are generated from the portion with a time at which a mass spectrometry unit for mass analyzing the ions extracted by the ion extraction electrode measures the ions, and (ii) synchronizing vibration of the probe with vibration of the holding table.

2. A mass spectrometry apparatus comprising:

a holding table configured to hold a specimen to be ionized;

a probe configured to identify a portion of the specimen to be ionized;

an ion extraction electrode configured to extract ions obtained by ionizing the specimen;

a liquid supplying unit configured to supply liquid to between the specimen and the probe to form a liquid bridge between the specimen and the probe;

a vibrating unit configured to vibrate one of the probe and the holding table;

an electric field generating unit configured to generate an electric field between the probe and the ion extraction electrode;

a mass spectrometry unit configured to mass analyze ions extracted by the ion extraction electrode; and a synchronization unit configured to synchronize a time at which ions are generated from the portion with a time at which the mass spectrometry unit measures the ions.

3. The mass spectrometry apparatus according to claim 2, further comprising:

a unit configured to vibrate one of the probe and the holding table, wherein the synchronization unit synchronizes vibration caused by the vibrating unit with a time at which the mass spectrometry unit measures the ions.

4. The mass spectrometry apparatus according to claim 2, wherein the vibrating unit includes a unit configured to vibrate the probe and a unit configured to vibrate the holding table, and wherein the synchronization unit synchronizes the unit configured to vibrate the probe, the unit configured to vibrate the holding table, and a time at which the mass spectrometry unit measures the ions with one another.

5. The mass spectrometry apparatus according to claim 3, wherein the vibrating unit causes a time period for which the liquid bridge is formed in the portion of the specimen to be ionized and a time period for which ions are generated from the portion to alternately occur.

6. The mass spectrometry apparatus according to claim 3, wherein the synchronization unit synchronizes the time at which ions are generated with a time at which one end of the probe that vibrates moves close to the ion extraction electrode.

7. The mass spectrometry apparatus according to claim 3, wherein the synchronization unit synchronizes the time at which ions are generated with a time at which the holding table vibrates.

8. The mass spectrometry apparatus according to claim 3, wherein the synchronization unit synchronizes the time at which ions are generated with a time at which the holding table moves close to the ion extraction electrode.

9. The mass spectrometry apparatus according to claim 3, further comprising:

a measuring unit configured to measure an amplitude and a frequency of vibration of at least one of the probe and the holding table.

10. The mass spectrometry apparatus according to claim 9, wherein the synchronization unit is a unit configured to generate a gate signal for controlling measurement of ions performed by the mass spectrometry unit in synchronization with a signal input to the measuring unit.

11. The mass spectrometry apparatus according to claim 2, further comprising:

a scanning unit configured to scan the probe relative to a surface of the specimen.

12. An imaging system comprising:

the mass spectrometry apparatus according to claim 2;

an image forming unit configured to form image information used for imaging distribution of a component of a substance contained in a specimen using mass information analyzed by the mass spectrometry apparatus and information regarding a position in the specimen; and an output unit configured to output the image information.

13. A mass spectrometry method for ionizing a specimen and performing mass spectrometry, comprising:

causing a probe to move closer to, or be in contact with, a portion of a specimen to be ionized and forming a liquid bridge between the specimen and the probe;

generating ions from liquid deposited to the probe and directing the ions to a mass spectrometry unit that performs mass spectrometry; and mass analyzing the ions, wherein a time at which ions are generated from the portion of the specimen identified by the probe is synchronized with a time at which the mass spectrometry unit measures the ions.

14. The mass spectrometry method according to claim 12, wherein vibration of one of the probe and the holding table causes a time period for which the ions are generated and a time period for which the liquid bridge is formed to occur.

15. An ionization device comprising:

a holding table configured to hold a specimen;

a probe configured to identify a portion of the specimen to be ionized;

an ion extraction electrode configured to extract ions obtained by ionizing the specimen;

a liquid supplying unit configured to supply liquid to between the specimen and the probe so as to form a liquid bridge between the specimen and the probe; and a voltage applying unit configured to apply a voltage between a portion of the probe in contact with the liquid bridge and the ion extraction electrode, wherein at least the probe has a vibrating unit that repeatedly moves the probe close to the holding table and moves the probe away from the holding table, and wherein the vibrating unit vibrates the probe at least at two different frequencies, one of which is a frequency for forming the liquid bridge and the other of which is a frequency that is greater than the frequency for forming the liquid bridge.

16. The ionization device according to claim 15, wherein the vibrating unit includes a probe vibrating unit configured to vibrate the probe and a holding table vibrating unit configured to vibrate the holding table, and wherein a frequency of vibration of the probe is an integral multiple of a frequency of vibration of the holding table, where the integral multiple is 2 or more.

17. The ionization device according to claim 16, wherein the vibrating unit is a probe vibrating unit for vibrating the probe, and wherein a frequency for forming the liquid bridge is set to an integer fraction of the frequency of vibration of the probe by modulating an amplitude of the vibration of the probe.

18. A mass spectrometry apparatus comprising:

the ionization device according to claim 15; and a mass spectrometry unit configured to analyze the mass-to-charge ratio of the ions.

19. An imaging system comprising:

the mass spectrometry apparatus according to claim 18; and an image information generating unit configured to generate, as image information, a distribution of a component of a substance contained in a specimen using information regarding a signal intensity of a mass spectrum obtained by the mass spectrometry apparatus and information regarding a position in the specimen.

20. An ionization method comprising:

causing a probe to move closer to a surface of a specimen held by the holding table and identifying a portion of the specimen to be ionized;

supplying liquid to form a liquid bridge between the specimen and the probe; and directing ions to a mass spectrometry unit by applying a voltage between a portion of the probe in contact with the liquid bridge and an ion extraction electrode, wherein vibration that repeatedly moves the probe closer to the holding table and away from the holding table occurs, and wherein the vibration has at least two different frequencies, one of which is a frequency for forming the liquid bridge and the other of which is a frequency for vibrating the probe that is higher than the frequency for forming the liquid bridge.

* * * * *